(12) United States Patent
Marugame et al.

(10) Patent No.: US 7,860,340 B2
(45) Date of Patent: Dec. 28, 2010

(54) THREE-DIMENSIONAL SHAPE ESTIMATION SYSTEM AND IMAGE GENERATION SYSTEM

(75) Inventors: Atsushi Marugame, Tokyo (JP); Hitoshi Imaoka, Tokyo (JP)

(73) Assignee: NEC Corporation, Tokyo (JP)

( * ) Notice: Subject to any disclaimer, the term of this patent is extended or adjusted under 35 U.S.C. 154(b) by 823 days.

(21) Appl. No.: 11/718,601

(22) PCT Filed: Nov. 1, 2005

(86) PCT No.: PCT/JP2005/020067

§ 371 (c)(1),
(2), (4) Date: Jul. 26, 2007

(87) PCT Pub. No.: WO2006/049147

PCT Pub. Date: May 11, 2006

(65) Prior Publication Data

US 2008/0008399 A1     Jan. 10, 2008

(30) Foreign Application Priority Data

Nov. 4, 2004  (JP) ............................. 2004-321159

(51) Int. Cl.
G06K 9/40   (2006.01)
G06K 9/00   (2006.01)
G06K 9/36   (2006.01)
G06T 1/00   (2006.01)
G06T 15/00  (2006.01)

(52) U.S. Cl. ...................... 382/274; 382/118; 382/154; 382/285; 345/418; 345/419

(58) Field of Classification Search ................ 382/118, 382/154; 345/418, 419, 426
See application file for complete search history.

(56) References Cited

U.S. PATENT DOCUMENTS

2001/0033685 A1* 10/2001 Ishiyama .................... 382/154

(Continued)

FOREIGN PATENT DOCUMENTS

JP          5-266173 A     10/1993

(Continued)

OTHER PUBLICATIONS

Rui Ishiyama, Shizuo Sakamoto, "Geodesic Illumination Basis: Compensating for Illumination Variations in any Pose for Face Recognition," Pattern Recognition, International Conference on, p. 40297, 16th International Conference on Pattern Recognition (ICPR'02)—vol. 4, 2002, p. 297-301.*

(Continued)

*Primary Examiner*—Bhavesh M Mehta
*Assistant Examiner*—Gandhi Thirugnanam
(74) *Attorney, Agent, or Firm*—Dickstein Shapiro LLP

(57) ABSTRACT

A 3D shape estimation system has a storage device, a relative shape analysis module, a feature point location search module and an absolute shape analysis module. The storage device stores first and second learning data which represent illumination bases and 3D shapes of objects, respectively. The relative shape analysis module calculates an "illumination basis" of an object based on a 2D image of the object and the first learning data, calculates a "relative shape function" that is partial differential of a "shape function" indicating a 3D shape of the object from the illumination basis, and outputs a relative shape data indicating the relative shape function. The feature point location search module extracts a plurality of feature points from the input 2D face image based on the 2D image and the relative shape data, and outputs a feature point location data indicating locations of the feature points. The absolute shape analysis module receives the relative shape data and the feature point location data, converts the relative shape function into the shape function by referring to the second learning data and the locations of the feature points, and outputs a 3D absolute shape data indicating the shape function.

20 Claims, 18 Drawing Sheets

U.S. PATENT DOCUMENTS

| | | | |
|---|---|---|---|
| 2005/0175234 A1* | 8/2005 | Sakamoto | 382/154 |
| 2006/0280342 A1* | 12/2006 | Lee et al. | 382/118 |
| 2006/0280343 A1* | 12/2006 | Lee et al. | 382/118 |
| 2007/0009135 A1* | 1/2007 | Ishiyama | 382/103 |

FOREIGN PATENT DOCUMENTS

| | | |
|---|---|---|
| JP | 11-242745 | 9/1999 |
| JP | 2001-084362 A | 3/2001 |
| JP | 2003-228702 A | 8/2003 |
| JP | 2004-005509 A | 1/2004 |
| JP | 2004-054947 A | 2/2004 |
| JP | 2004-086929 A | 3/2004 |
| WO | WO-02/07095 A1 | 1/2002 |

OTHER PUBLICATIONS

Peter Belhumeur, David Kriegman, "What Is the Set of Images of an Object under All Possible Illumination Conditions?", 1998, International Journal of Computer Vision, vol. 28 Issue 3, ,p. 1-16.*

Saratendu Sethi, Stan Sclaroff, "Combinations of Deformable Shape Prototypes", Jul. 1999, Boston University Computer Science Technical Report No. 99-007, p. 1-16.*

Gregory D. Hager, Peter N. Belhumeur, "Efficient Region Tracking With Parametric Models of Geometry and Illumination", Oct. 1998, IEEE Transactions on Pattern Analysis and Machine Intelligence, vol. 20, No. 10, p. 1025-1039.*

Thomas Vetter, et al.; "A Morphable Model for The Synthesis of 3D Faces"; ACM Conf. SIGGRAPH 99, pp. 187-194, 1999.

Amon Shashua, Tammy Riklin-Raviv; "The Quotient Image: Class-Based Re-Rendering and Recognition with Varying Illuminations"; IEEE Transactions on Pattern Analysis and Machine Intelligence, vol. 23, No. 2, Feb. 2001, pp. 129-139.

* cited by examiner

THREE-DIMENSIONAL SHAPE ESTIMATION SYSTEM AND IMAGE GENERATION SYSTEM

TECHNICAL FIELD

The present invention relates to a system, a method and a program for estimating a 3D shape of an object from a 2D image of the object. The present invention relates to a system, a method and a program for generating a 2D image with a different illumination condition or a 2D image with a different illumination condition and different orientation of an object from a 2D image of the object.

BACKGROUND ART

As a general technique of constructing and estimating a 3D shape of an object from its 2D image, a technique disclosed in Japanese Unexamined Patent Publication No. 1999-242745 is known, for example. According to the technique, stereo/multi-lens images taken by two or more cameras or a pattern irradiated image in which a known pattern irradiated with visible light or infrared light is taken are used. In a case where a shape of the object is limited, the 3D shape of the object can be estimated from one image by utilizing the limitation in the shape. For example, in a case where a vertical line intersects a horizontal line at right angles as in a building or in a case where a specific pattern such as a repeated pattern is drawn on a plane, the 3D shape of the object can be calculated by using vanishing point principle and geometric information such as compound ratio. However, in a case of a "face", that is, as for an object having no formulaic and geometric limitation in shape such as a plane or a sphere and no specific pattern in color/brightness, the above-mentioned general stereo/multi-lens images and the pattern irradiated image are used.

However, according to such methods, measurement apparatuses such as a plurality of cameras (stereo/multiple-lens camera), a pattern irradiator for irradiating pattern light, a camera for detecting light such as the infrared light and the like, which are not used in normal photographing, are necessary. This causes problems such as an increase in costs and a limitation in measurement environment. Furthermore, it is necessary to store information at the time of the measurement such as a position of the camera and an irradiating position of the pattern irradiator at the time of photographing. This causes problems that the measurement environment is limited and only an image previously taken in the environment dedicated to the measurement can be used. The "face" is often taken as a single image with disregard to the measurement. Consequently, according to the conventional technique, it is impossible to estimate a 3D shape of the face from the single face image.

In this connection, according to a technique disclosed in Japanese Unexamined Patent Publication No. 2001-84362, an object with a 3D shape including a part having a substantially constant surface reflection rate is photographed under a substantially single light source. A direction of the light source and the 3D shape of the object are estimated based on the image obtained by the photographing. A face classification system disclosed in Japanese Unexamined Patent Publication No. 1993-266173 has a first means for locating a face in a 2D display of a 3D frame, a second means for detecting the face in the display, a third means for generating a feature vector of the face and a fourth means for comparing the feature vector of the face detected this time with a feature vector of the face detected previously and thereby determining whether or not the face detected this time corresponds to the face detected previously. International Publication No. WO-02/007095-A1 discloses a face 3D orientation tracking device for sequentially estimating an orientation of a person's face from input images taken in a time-series fashion.

Although the face does not have formulaic and geometric shape such as a plane or a sphere, a schematic arrangement and a topological shape of feature points such as eyes, a mouse and the like are the same. Individual various facial shapes can be obtained based on a degree of deviation of the feature point arrangement from a standard face. Moreover, since photographed face images are overwhelmingly full-faced images, there is a limitation in the topological shape with respect to the face image. From that point of view, a 3D face shape is estimated from a single face image by using a learning model obtained from 3D face shapes of a plurality of persons (refer to T. Vetter et al., "A Morphable Model For The Synthesis of 3D Faces", ACM Conf. SIGGRAPH 99, pp. 187-194, 1999). However, according to the method, it is necessary to manually designate feature points in the face image in order to match the face image to the learning model.

DISCLOSURE OF INVENTION

An object of the present invention is to provide a 3D shape estimation system, a 3D shape estimation program, a 3D shape estimation method, an image generation system, an image generation program and an image generation method which can estimate illumination basis of an object from a single 2D image of the object.

Another object of the present invention is to provide a 3D shape estimation system, a 3D shape estimation program, a 3D shape estimation method, an image generation system, an image generation program and an image generation method which can automatically find feature points of an object from a single 2D image of the object.

Still another object of the present invention is to provide a 3D shape estimation system, a 3D shape estimation program and a 3D shape estimation method which can estimate a 3D shape of an object from a single 2D image of the object without using any special measurement apparatus.

Still another object of the present invention is to provide an image generation system, an image generation program and an image generation method which can generate an image of an object with different orientation or different illumination condition from a single 2D image of the object.

In a first aspect of the present invention, a 3D shape estimation system is provided. The 3D shape estimation system has a storage device, a relative shape analysis module, a feature point location search module and an absolute shape analysis module. The storage device stores a first learning data and a second learning data which represent illumination bases and 3D shapes of a plurality of objects, respectively. The relative shape analysis module calculates an "illumination basis" of an object based on a 2D image of the object and the first learning data, calculates a "relative shape function" that is partial differential of a "shape function" representing a 3D shape of the object from the illumination basis, and outputs a relative shape data representing the relative shape function. The feature point location search module extracts a plurality of feature points from the input 2D face image based on the 2D image and the relative shape data, and outputs a feature point location data representing locations of the plurality of feature points. The absolute shape analysis module receives the relative shape data and the feature point location data, converts the relative shape function into the shape function with reference to the second learning data and the locations of the plurality of feature points, and outputs a 3D absolute shape data representing the shape function.

In the 3D shape estimation system, the above-mentioned plurality of feature points include at least one first feature point having a feature of color/brightness and at least one second feature point having a feature of shape. In this case, the feature point location search module extracts the first feature point by using the input 2D image. Furthermore, the feature point location search module calculates curvature of a surface of the object under processing by using the relative shape function represented by the relative shape data, and extracts the second feature point based on the location of the first feature point and the curvature.

In the 3D shape estimation system, when the 2D image is expressed by using the xy-coordinate system, the shape function is expressed by $f(x, y)$, the relative shape function is expressed by $(f_x, f_y) = (\partial f/\partial x, \partial f/\partial y)$, and the illumination basis is expressed by $B = \{B_x, B_y, B_z\}$. Here, $B_\alpha = \{b_{i,\alpha}\}$ ($\alpha = x, y, z$; i is a number of each pixel). In this case, the relative shape analysis module calculates the relative shape function $(f_x, f_y)$ by $(f_x, f_y) = (b_{i,x}/b_{i,z}, b_{i,y}/b_{i,z})$, based on the calculated illumination basis.

When one of the plurality of feature points is set as an origin, the position of each of the plurality of feature points is expressed as a relative position. In this case, the second learning data includes information representing an average value of the relative positions in the plurality of objects with respect to each of the plurality of feature points, information of a modified shape function $g(x, y)$, and information of a modified relative shape function $(g_x, g_y) = (\partial g/\partial x, \partial g/\partial y)$ that is partial differential of the modified shape function $g(x, y)$. The modified shape function $g(x, y)$ is obtained for each of the plurality of objects by performing coordinate transformation of the shape function $f(x, y)$ such that the respective relative positions of the plurality of feature points correspond to the above-mentioned average values.

The absolute shape analysis module calculates the relative positions of the plurality of feature points of the object under processing with respect to the origin, based on the feature point location data. The absolute shape analysis module calculates the modified relative shape function $(g_x, g_y)$ of the object under processing by performing coordinate transformation of the relative shape function $(f_x, f_y)$ represented by the relative shape data such that the respective relative positions of the plurality of feature points correspond to the average values represented by the second learning data. Furthermore, the absolute shape analysis module converts the modified relative shape function $(g_x, g_y)$ of the object under processing into the modified shape function $g(x, y)$ of the object under processing, by referring to the information of the modified shape function $g(x, y)$ and the modified relative shape function $(g_x, g_y)$ which are represented by the second learning data. Subsequently, the absolute shape analysis module calculates the shape function $f(x, y)$ of the object under processing by performing coordinate transformation of the modified shape function $g(x, y)$ such that the locations of the plurality of feature points return back to the locations represented by the feature point location data.

In the above-described 3D shape estimation system, the object is a face of a person.

In a second aspect of the present invention, an image generation system is provided. The image generation system has the above-described 3D shape estimation system and an image generation module. The image generation module receives an illumination basis data representing the illumination basis of the object under processing from the relative shape analysis module of the 3D shape estimation system. The image generation module generates an illumination-transformed image with a different illumination condition from the input 2D image, based on the illumination basis and arbitrary illumination intensity.

Moreover, the image generation module receives the 3D absolute shape data of the object under processing from the absolute shape analysis module of the 3D shape estimation system. The image generation module generates a new 3D shape with a different illumination condition, by combining the illumination-transformed image with the 3D shape. Furthermore, the image generation module generates a rotation-transformed image with a different illumination condition and different orientation of the object from the input 2D image, by rotating the new 3D shape.

An image generation system according to the present invention has a storage device, a relative shape analysis module and an image generation module. The storage device stores a first learning data representing illumination bases of a plurality of objects. The relative shape analysis module calculates an illumination basis of an object based on a 2D image of the object and the first learning data, and outputs an illumination basis data representing the calculated illumination basis. The image generation module generates an illumination-transformed image with a different illumination condition from the input 2D image, based on the illumination basis and arbitrary illumination intensity.

In a third aspect of the present invention, a 3D shape estimation program recorded in a computer-readable recording medium is provided. The 3D shape estimation program causes a computer to perform the following steps: (A) a step of storing a first learning data and a second learning data which represent illumination bases and 3D shapes of a plurality of objects, respectively, in a storage device; (B) a step of calculating an illumination basis of an object based on a 2D image of the object and the first learning data; (C) a step of calculating a relative shape function that is partial differential of a shape function representing a 3D shape of the object, based on the calculated illumination basis; (D) a step of extracting a plurality of feature points from the input 2D face image, based on the 2D image and the relative shape function; and (E) a step of converting the calculated relative shape function into the shape function with reference to the second learning data and locations of the plurality of feature points.

The plurality of feature points include at least one first feature point having a feature of color/brightness and at least one second feature point having a feature of shape. In this case, the above-mentioned (D) step includes: (D1) a step of extracting the first feature point by using the input 2D face image; (D2) a step of calculating curvature of a surface of the object by using the relative shape function; and (D3) a step of extracting the second feature point based on the location of the first feature point and the calculated curvature.

When the 2D image is expressed by using the xy-coordinate system, the shape function is expressed by $f(x, y)$, the relative shape function is expressed by $(f_x, f_y) = (\partial f/\partial x, \partial f/\partial y)$, and the illumination basis is expressed by $B = \{B_x, B_y, B_z\}$. Here, $B_\alpha = \{b_{i,\alpha}\}$ ($\alpha = x, y, z$; i is a number of each pixel). In this case, the above-mentioned (C) step includes a step of calculating the relative shape function $(f_x, f_y)$ by $(f_x, f_y) = (b_{i,x}/b_{i,z}, b_{i,y}/b_{i,z})$ based on the calculated illumination basis.

The above-mentioned (A) step includes: (A1) a step of reading respective 3D shapes of the plurality of objects; (A2) a step of determining locations of the plurality of feature points with respect to each of the plurality of objects, based on the 3D shapes; (A3) a step of determining one of the plurality of feature points as an origin; (A4) a step of calculating a position of each of the plurality of feature points with respect to the origin as a relative position; (A5) a step of calculating an average value of the relative positions in the plurality of objects for each of the plurality of feature points; (A6) a step of calculating a modified shape function g(x, y) by performing coordinate transformation of the shape function f(x, y) such that respective relative positions of the plurality of feature points correspond to the above-mentioned average values; (A7) a step of calculating a modified relative shape function $(g_x, g_y)=(\partial g/\partial x, \partial g/\partial y)$ that is partial differential of the modified shape function g(x, y); and (A8) a step of storing the second learning data in the storage device, the second learning data including information of the modified shape function g(x, y), information of the modified relative shape function $(g_x, g_y)$ and data representing the average value with respect to each of the plurality of feature points.

The above-mentioned (E) step includes: (E1) a step of calculating the relative positions of the plurality of feature points of the object under processing with respect to the origin; (E2) a step of calculating the modified relative shape function $(g_x, g_y)$ of the object under processing by performing coordinate transformation of the relative shape function $(f_x, f_y)$ such that the respective relative positions of the plurality of feature points correspond to the average values represented by the second learning data; (E3) a step of converting the modified relative shape function $(g_x, g_y)$ of the object under processing into the modified shape function g(x, y) of the object under processing, by referring to the information of the modified shape function g(x, y) and the modified relative shape function $(g_x, g_y)$ which are represented by the second learning data; and (E4) a step of calculating the shape function f(x, y) of the object under processing by performing coordinate transformation of the modified shape function g(x, y) such that the locations of the plurality of feature points return back to the locations represented by the input 2D image.

In a fourth aspect of the present invention, an image generation program is provided. The image generation program causes a computer to perform the following steps: (a) a step of storing a first learning data representing illumination bases of a plurality of objects in a storage device; (b) a step of calculating an illumination basis of an object, based on a 2D image of the object and the first learning data; and (c) a step of generating an illumination-transformed image with a different illumination condition from the input 2D image, based on the illumination basis and arbitrary illumination intensity.

The image generation program further causes the computer to perform the following steps: (d) a step of storing a second learning data representing 3D shapes of the plurality of objects in the storage device; (e) a step of calculating a relative shape function that is partial differential of a shape function representing a 3D shape of the object, based on the calculated illumination basis; (f) a step of extracting a plurality of feature points from the input 2D face image, based on the 2D image and the relative shape function; (g) a step of converting the relative shape function into the shape function with reference to the second learning data and locations of the plurality of feature points; (h) a step of generating a new 3D shape with a different illumination condition based on the illumination-transformed image and the shape function; and (i) a step of generating a rotation-transformed image with a different illumination condition and different orientation of the object from the input 2D image, by rotating the new 3D shape.

A 3D shape estimation method and an image generation method according to the present invention include steps similar to the steps achieved by the above-mentioned 3D shape estimation program and the above-mentioned image generation program.

According to the 3D shape estimation system, the 3D shape estimation program, the 3D shape estimation method, the image generation system, the image generation program and the image generation method of the present invention, it is possible to estimate illumination basis of an object from a single 2D image of the object.

According to the 3D shape estimation system, the 3D shape estimation program, the 3D shape estimation method, the image generation system, the image generation program and the image generation method of the present invention, it is possible to automatically find feature points of an object from a single 2D image of the object.

According to the 3D shape estimation system, the 3D shape estimation program and the 3D shape estimation method of the present invention, it is possible to estimate a 3D shape of an object from a single 2D image of the object without using any special measurement apparatus. Thus, the costs can be reduced.

According to the image generation system, the image generation program and the image generation method of the present invention, it is possible to generate an image of an object with different orientation or different illumination condition from a single 2D image of the object.

BEST MODE FOR CARRYING OUT THE INVENTION

A 3D shape estimation system, a 3D shape estimation program, a 3D shape estimation method, an image generation system, an image generation program and an image generation method according to the present invention will be described with reference to the attached drawings.

First, concepts used in the description of embodiments of the present invention will be explained. In the embodiments of the present invention, a target object of which 3D shape is estimated is exemplified by a human's "face".

Figure 1:
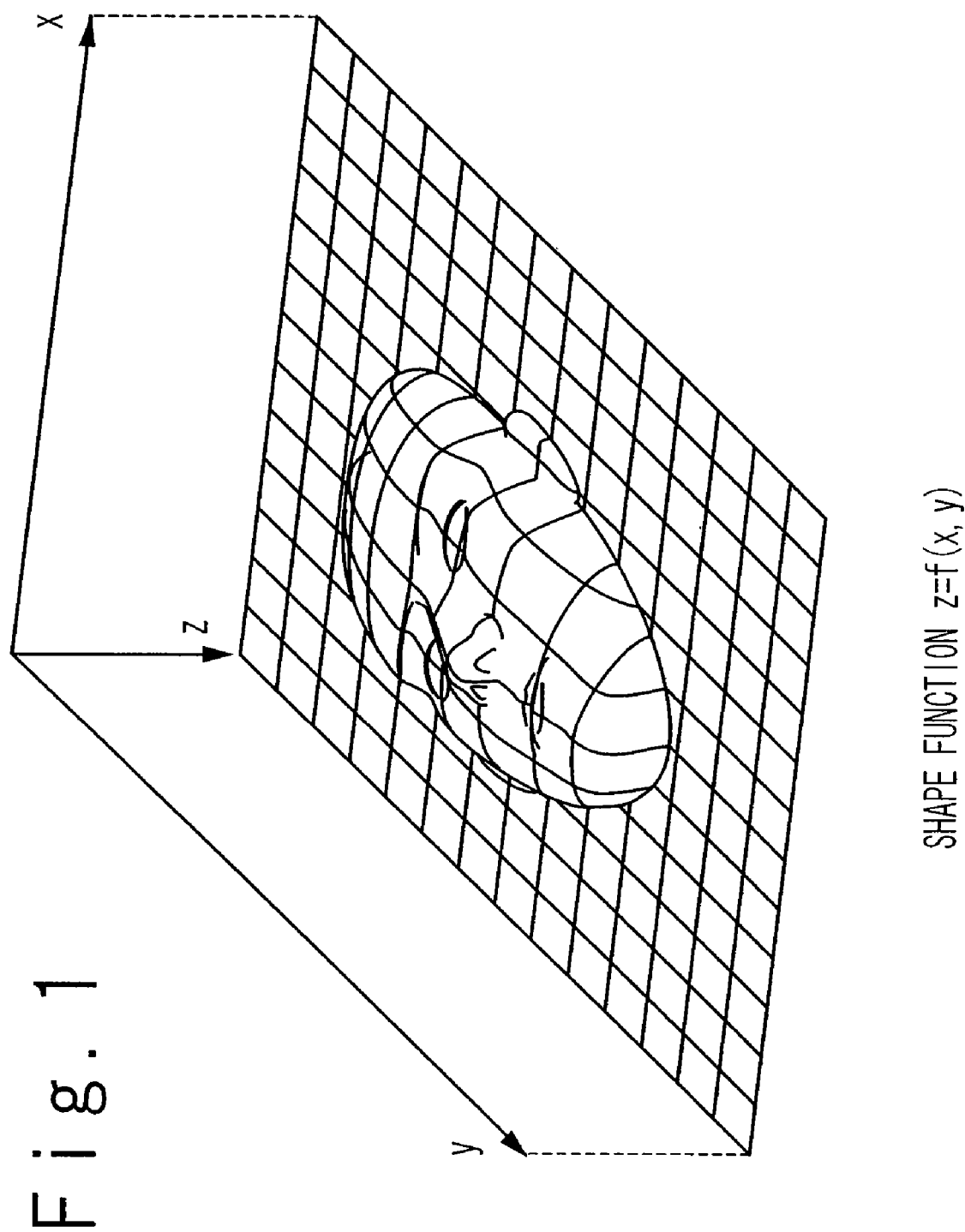
FIG. 1 is a view for explaining a shape function which expresses a 3D shape of a face.

FIG. 1 is a view for explaining a "shape function" which expresses a 3D shape of a face. The 3D shape of such an object can be measured, for example, by using a range finder. The range finder is an apparatus for acquiring a shape (relative position information) and color information of the object and loading the information onto a computer. Front coordinates x, y and a depth coordinate z of a surface of the object can be obtained by the range finder. That is, the 3D shape of the face is expressed by the xyz-coordinate system as shown in FIG. 1, and a "shape function z" representing the 3D shape is given by the following equation.

[Equation 1]

$$z = f(x, y) \quad (1)$$

Also, a partial differential form of the shape function z is given by the following equation.

[Equation 2]

$$(f_x, f_y) = \left(\frac{\partial z}{\partial x}, \frac{\partial z}{\partial y}\right) \quad (2)$$

The function group $(f_x, f_y)$ indicates differential information of the shape function z and serves as a parameter for expressing a relative shape of the object such as curvature of the surface of the object. From this viewpoint, the function group $(f_x, f_y)$ is hereinafter referred to as a "relative shape function".

Figure 2:
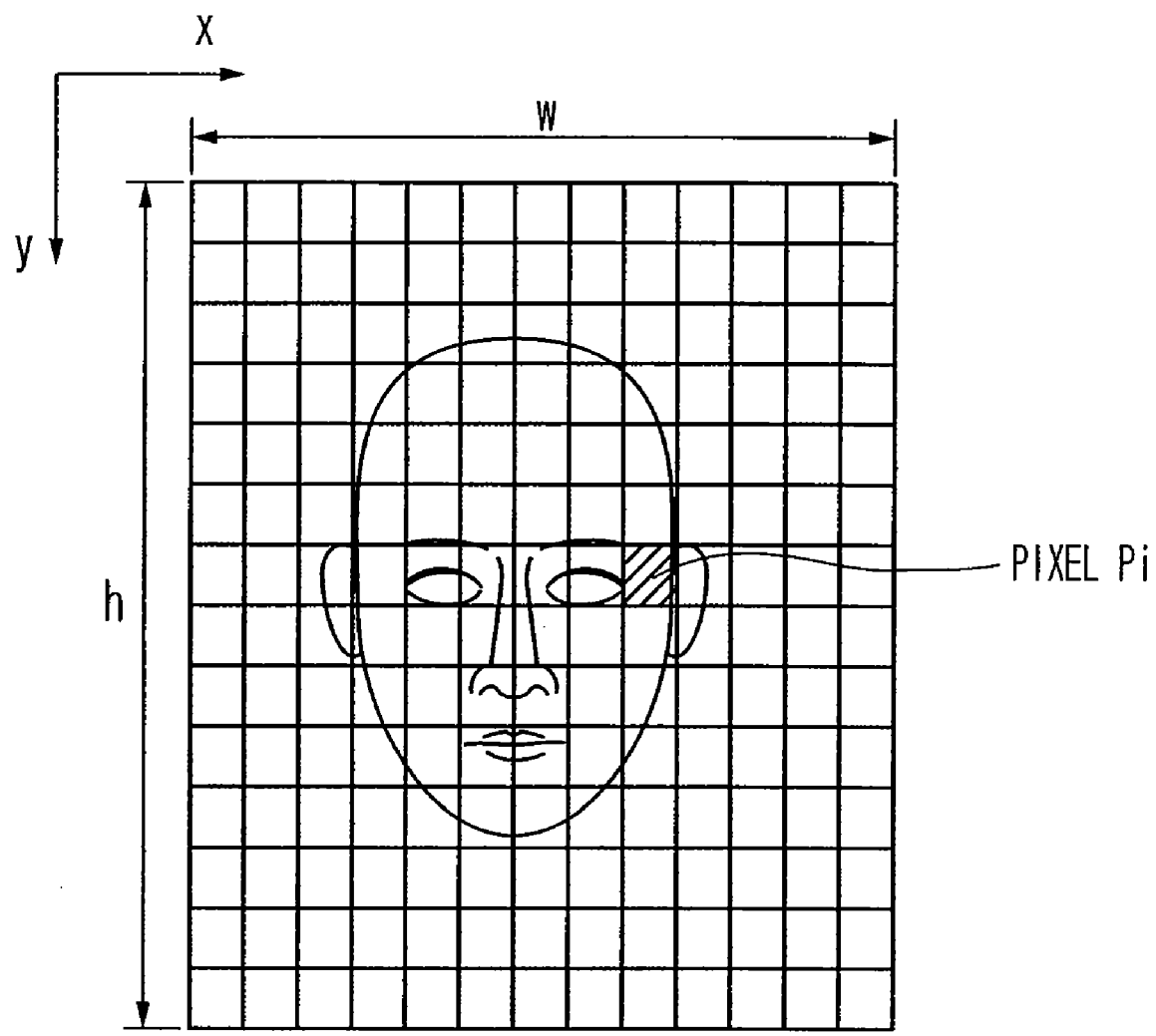
FIG. 2 is a schematic view showing a 2D image of a face.

FIG. 2 is a schematic view showing a 2D image of a face. The 2D image is given on the xy plane. In FIG. 2, a horizontal direction of the face corresponds to the x-direction and a vertical direction of the face corresponds to the y-direction. The numbers of pixels in the x and y directions are given by w and h, respectively. That is, the total number of pixels s of the 2D image is given by s=w×h.

The 2D image of the face includes brightness information and color information. Since the brightness and color information are determined depending on reflection on the facial shape, it is possible to estimate the facial shape by photographing the face with a plurality of lights, if a position and an orientation of the face are fixed. One of such ideas is an "illumination basis" described in Peter N. Belhumeur et al., "What Is the Set of Images of an Object Under All Possible Illumination Conditions?", International Journal of Computer Vision, Vol. No. 28, pp. 245-260, 1998. The illumination basis (GIB: Geodesic Illumination Basis) is a descriptor of illumination variation in each location of the surface of the face.

A diffuse reflectance and a normal vector of the face surface at the i-th pixel $P_i$ of the 2D image are given by $a_i$ and $n_i = (n_{i,x}, n_{i,y}, n_{i,z})$, respectively. An illumination intensity vector s representing a direction of the illumination at the pixel $P_i$ is given by $s = (s_x, s_y, s_z)$. In this case, the "brightness $X_i$" at the pixel $P_i$ is given by the following equation.

[Equation 3]

$$X_i = a_i \vec{n}_i \cdot \vec{s} = \vec{b}_i \cdot \vec{s} \quad (3)$$

Here, the vector $b_i$ is given by the following equation.

[Equation 4]

$$\vec{b}_i = a_i \vec{n}_i = (b_{i,x}, b_{i,y}, b_{i,z}) \quad (4)$$

Therefore, a "brightness vector X" representing the brightness $X_i$ with respect to all the pixels $p_i$ included in the 2D image is given by the following equation.

[Equation 5]

$$\vec{X} = \{X_i\} = \{\vec{b}_i \cdot \vec{s}\} \quad (5)$$

In the above-mentioned equations, the diffuse reflectance $a_i$ and the normal vector $n_i$, namely, the vector $b_i$ does not depend on the intensity and direction of the illumination but depends on only the shape and characteristics of the object. What varies when the illumination is changed is the illumination intensity vector s. A set I of the brightness vectors X of the 2D image created by changing the illumination is expressed as follows.

[Equation 6]

$$I = \{\vec{X}\} = \{\vec{X} | \vec{X} = B \cdot \vec{s} = s_x B_x + s_y B_y + s_z B_z, \forall \vec{s}\} \quad (6)$$

Here, B is expressed as follows.

[Equation 7]

$$B = \{B_x, B_y, B_z\}, B_\alpha = \{b_{i,\alpha}\} (\alpha = x, y, z) \quad (7)$$

That is, $B_x = \{b_{i,x}\} = (b_{0,x}, \ldots, b_{s,x})$, $B_y = \{b_{i,y}\} = (b_{0,y}, \ldots, b_{s,y})$, and $B_z = \{b_{i,z}\} = (b_{0,z}, \ldots, b_{s,z})$. The B is referred to as the "illumination basis". The illumination basis (reflection information) is a descriptor of the illumination variation and can express the variation in the brightness in response to the illumination variation. As described above, the brightness of the image is determined depending on the illumination and the facial shape. In this sense, it can be said that the illumination basis (reflection information) is a parameter relating to the facial shape. In the present invention, the concept of the above-described "illumination basis" is used.

An object of the present invention is to eventually estimate the "3D shape (shape function f(x, y))" shown in FIG. 1 from the "2D image" shown in FIG. 2 with high accuracy. Another object of the present invention is to generate a 2D image with a different illumination condition or a 2D image with a different illumination condition and an orientation of the face from the "2D image" shown in FIG. 2. Such a technique can be applied to, for example, a security field such as a personal identification technique, a cosmetic surgery field, an amusement field and so forth. Configurations and operations of the present invention will be described below in detail.

FIRST EMBODIMENT

Figure 3:
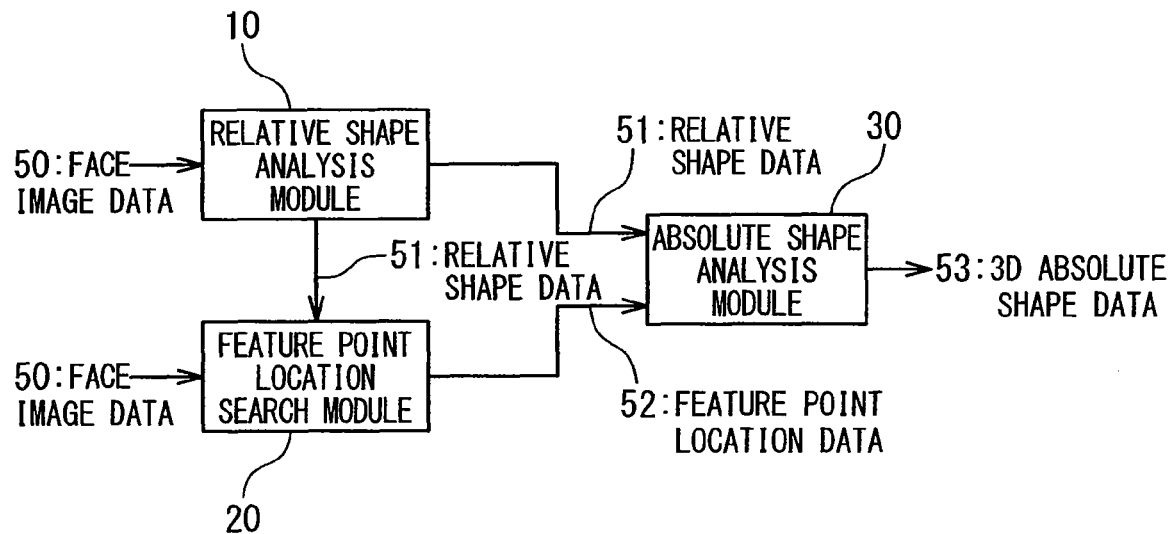
FIG. 3 is a block diagram showing a configuration of a 3D shape estimation system in accordance with a first embodiment of the present invention.

FIG. 3 is a block diagram showing a configuration of a 3D shape estimation system in accordance with a first embodiment of the present invention. The 3D shape estimation system 1 has a relative shape analysis module 10, a feature point location search module 20 and an absolute shape analysis module 30. The relative shape analysis module 10 receives a face image data 50 representing the 2D image of a face and estimates the relative shape function $(f_x, f_y)$ of the face on the basis of the brightness information and previously stored learning reflectance information. A relative shape data 51 representing the estimated relative shape function $(f_x, f_y)$ is output to the feature point location search module 20 and the absolute shape analysis module 30. The feature point location search module 20 receives the face image data 50 and the relative shape data 51 and automatically detects "feature points" of the face such as both eyes, a nose and the like. A feature point location data 52 representing the locations of the "feature points" is output to the absolute shape analysis module 30. The absolute shape analysis module 30 estimates the shape function f(x, y) of the face on the basis of the relative shape function $(f_x, f_y)$, the locations of the feature points and previously stored learning shape data. A 3D absolute shape data 53 representing the estimated shape function f(x, y) is output from the absolute shape analysis module 30. In this manner, according to the 3D shape estimation system 1 of the present embodiment, the 3D absolute shape data 53 (see FIG. 1) can be obtained from the face image data 50 (see FIG. 2).

Hereinafter, a configuration and an operation of each module will be described in detail.

Figure 4:
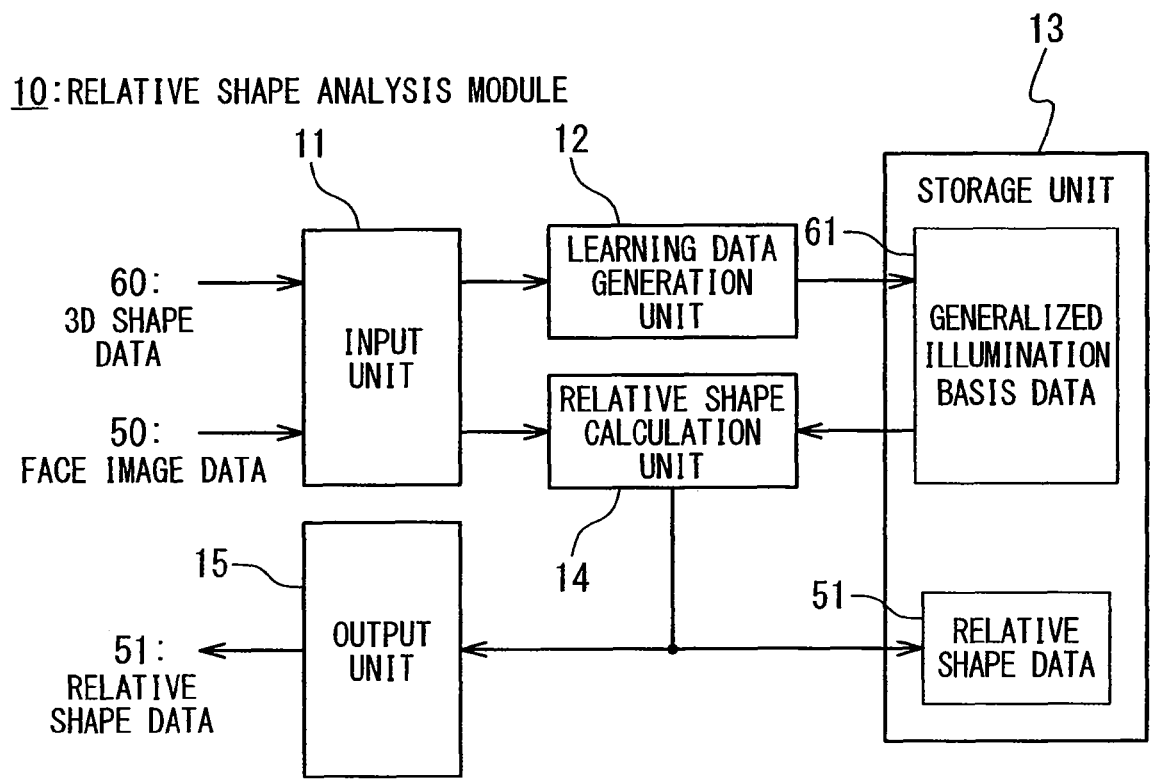
FIG. 4 is a block diagram showing a configuration of a relative shape analysis module in accordance with the present invention.

FIG. 4 is a block diagram showing a configuration of the relative shape analysis module 10 according to the present invention. The relative shape analysis module 10 is provided with an input unit 11, a learning data generation unit 12, a storage unit 13, a relative shape calculation unit 14 and an output unit 15. The storage unit 13 stores the relative shape data 51 and a generalized illumination basis data 61 therein. The generalized illumination basis data (first learning data) 61 represents generalized illumination bases of faces of a plurality of persons (a plurality of objects of the same type) and is previously stored through learning. The learning data generation unit 12 is a unit for generating the generalized illumination basis data 61 and is achieved with a CPU and a computer program. The relative shape calculation unit 14 is a unit for generating the relative shape data 51 and is achieved with the CPU and a computer program. The storage unit 13 is exemplified by a hard disk drive or a memory.

Figure 5:
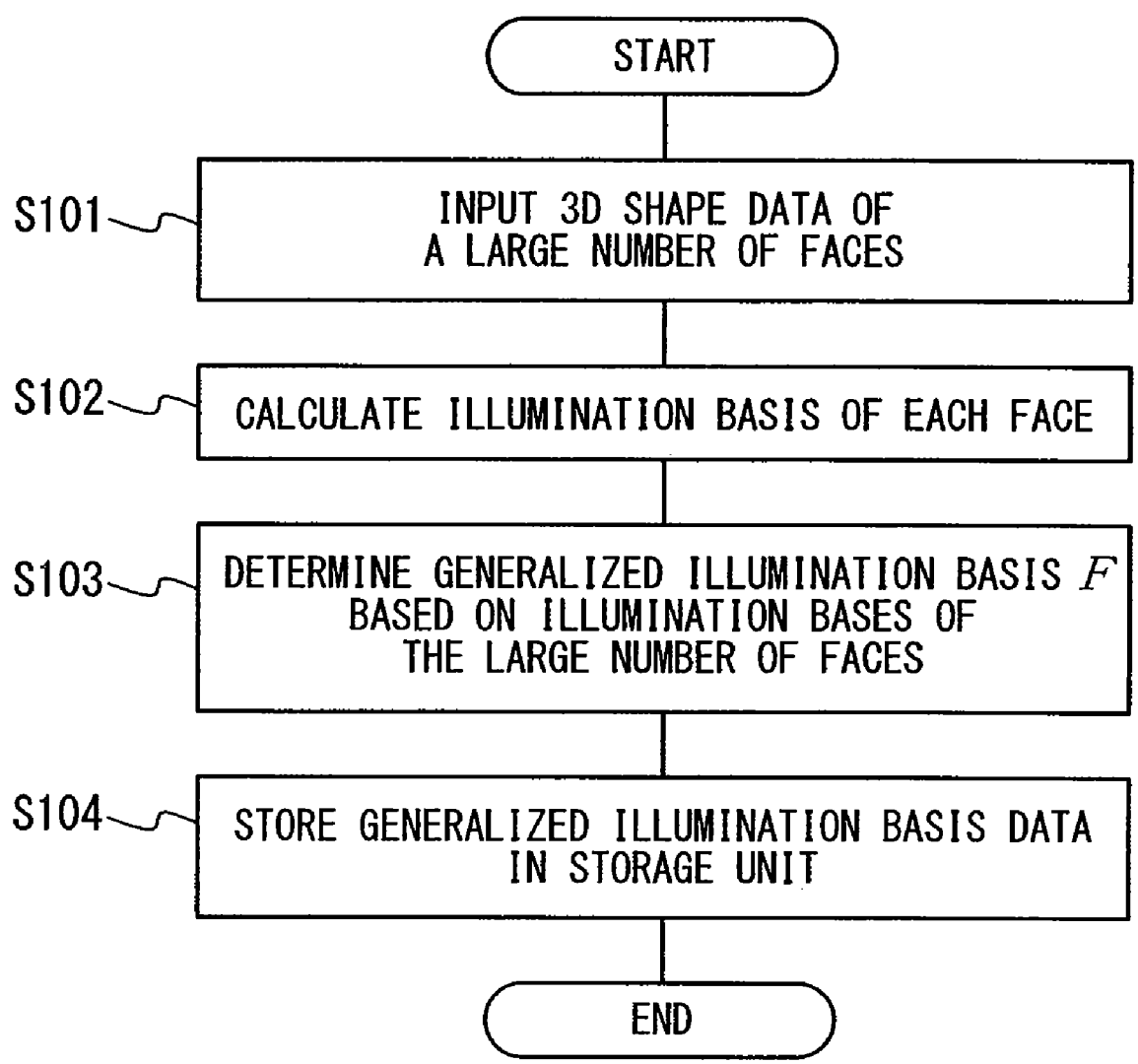
FIG. 5 is a flow chart showing an operation of the relative shape analysis module in accordance with the present invention.

First, the generalized illumination basis data 61 is generated. FIG. 5 is a flow chart showing an operation of the relative shape analysis module 10 when generating the generalized illumination basis data 61, namely, an operation of the learning data generation unit 12.

Step S101:

First, with respect to a plurality of persons, a face is irradiated with illumination from various directions and its photograph is taken. As a result, a plurality of 3D shape data 60 with texture are obtained. The 3D shape data 60 of the faces of the plurality of persons are input to the learning data generation unit 12 through the input unit 11.

Step S102:

Next, the learning data generation unit 12 calculates an illumination basis B of each face from the 3D shape data 60, based on the above-mentioned equation (6).

Step S103:

Next, the learning data generation unit 12 decomposes the illumination bases B of faces of the plurality of persons into components $A_1, A_2, \ldots A_n$ through a principal component analysis method or the like. Thereby, the illumination basis of a general face (the generalized illumination basis) B can be described as follows.

[Equation 8]

$$B = F(\beta_1, \beta_2, \ldots \beta_m, A_1, A_2, \ldots A_n) \qquad (8)$$

Here, $\beta_1, \beta_2, \ldots \beta_m$ are parameters which vary among persons.

Step S104:

The learning data generation unit 12 outputs the generalized illumination basis data 61 representing the generalized illumination basis B obtained in the above-mentioned Step S103 to the storage unit 13, and the data is stored in the storage unit 13.

Figure 6:
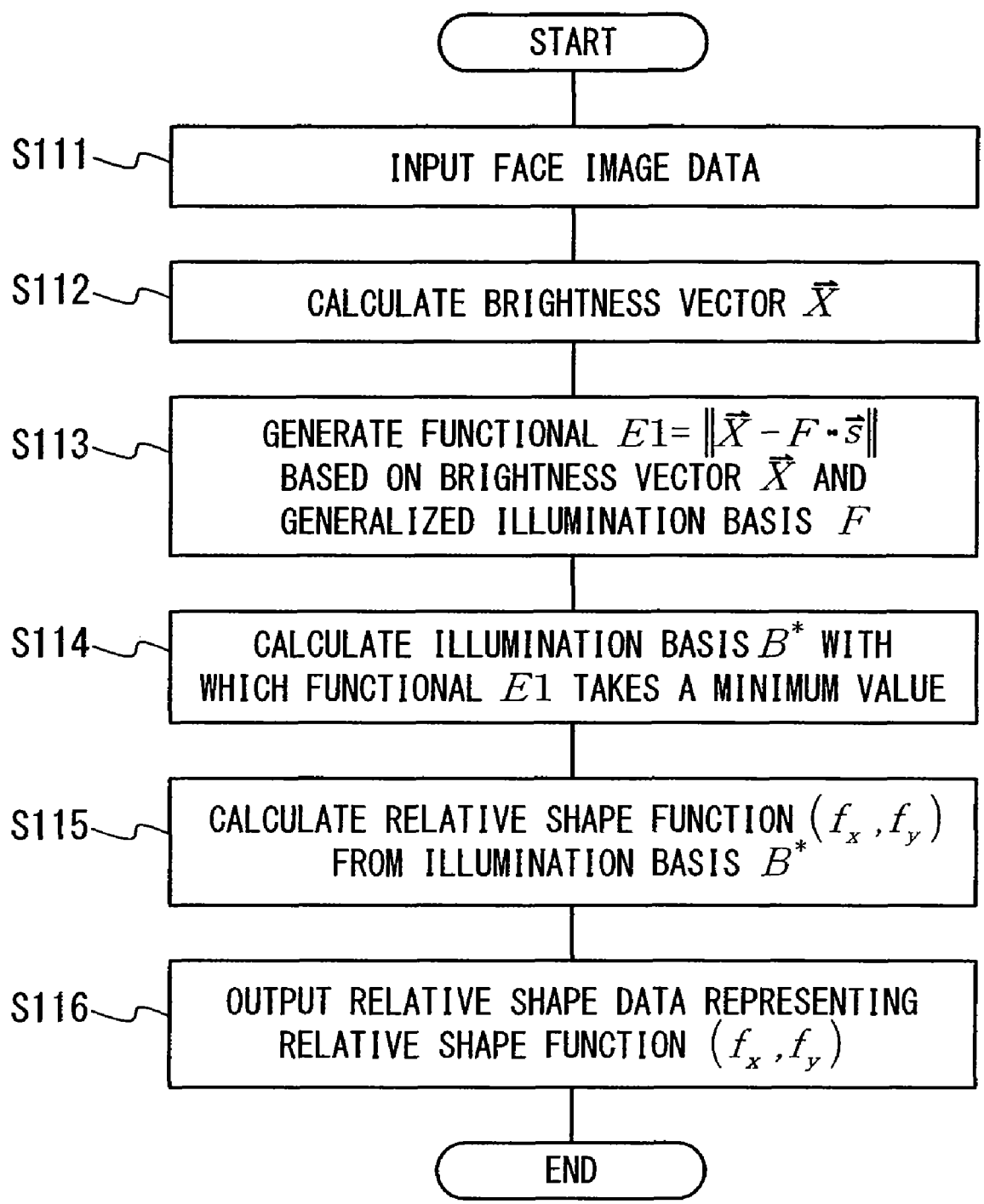
FIG. 6 is a flow chart showing an operation of the relative shape analysis module in accordance with the present invention.

Next, a method of estimating the relative shape data 51 representing the relative shape function $(f_x, f_y)$ of a face of a person from the face image data 50 representing the 2D image of the face of the person will be described. Orientation of the face of the person is known, while the illumination basis B of the person is unknown. FIG. 6 is a flow chart showing an operation of the relative shape calculation unit 14 of the relative shape analysis module 10.

Step S111:

The face image data 50 (see FIG. 2) representing the 2D image of the face of the person is input to the relative shape calculation unit 14 through the input unit 11.

Step S112:

The 2D face image has brightness information and color information. Therefore, the relative shape calculation unit 14 can extract the brightness vector $X=\{X_i\}$ expressed by the above-mentioned equation (5) from the face image data 50.

Step S113:

Next, the relative shape calculation unit 14 reads the generalized illumination basis data 61 from the storage unit 13 and obtains the generalized illumination basis $F(\beta_1, \beta_2, \ldots \beta_m, A_1, A_2, \ldots A_n)$. By using the brightness vector X, the generalized illumination basis F and the illumination intensity vector s, the relative shape calculation unit 14 generates a functional E1 expressed by the following equation.

[Equation 9]

$$E1 = \|\vec{X} - F(\beta_1, \beta_2, \ldots \beta_m, A_1, A_2, \ldots A_n) \cdot \vec{s}\| \qquad (9)$$

Step S114:

Next, the relative shape calculation unit 14 obtains parameters $\beta_1, \beta_2, \ldots \beta_m$ with which the functional E1 takes a minimum value. In a case of nonlinear computation, the relative shape calculation unit 14 calculates those parameters by using a repeated calculation method such as a hill-climbing method. Then, the relative shape calculation unit 14 sets the illumination basis $F(\beta_1, \beta_2, \ldots \beta_m, A_1, A_2, \ldots A_n)$ in the case of the calculated parameters $\beta_1, \beta_2, \ldots \beta_m$ as an illumination basis B* of the face. In this manner, the illumination basis B* of a face is calculated from the 2D image of the face by using the generalized illumination basis data (first learning data) 61.

Step S115:

The illumination basis B* can be expressed by the above-mentioned equation (7). According to the present invention, the relative shape calculation unit 14 calculates the relative shape function $(f_x, f_y)$ of the face on the basis of the illumination basis B* in accordance with the following equation.

[Equation 10]

$$(f_x, f_y) = (b_{i,x}/b_{i,z}, b_{i,y}/b_{i,z}) \quad (10)$$

In this manner, the relative shape function $(f_x, f_y)$ of a face is calculated from the 2D image of the face. As shown in the equation (2), the relative shape function $(f_x, f_y)$ represents the partial differentiation of the shape function f(x, y). The above-mentioned processing can be applied not only to the method based on the illumination basis but also to any model that associates the image with the relative shape as the differential information.

Step S116:

The relative shape calculation unit 14 outputs the relative shape data 51 representing the calculated relative shape function $(f_x, f_y)$ to the feature point location search module 20 and the absolute shape analysis module 30 through the output unit 15. Moreover, the relative shape calculation unit 14 may store the relative shape data 15 in the storage unit 13.

As described above, according to the relative shape analysis module 10 of the present invention, it is possible to estimate the illumination basis B of an object from the single 2D image of the object. Moreover, it is possible to estimate the relative shape function $(f_x, f_y)$ of the object from the single 2D image. Here, it is not necessary to photograph the object with using a special photographic equipment such as a stereo/multiple-lens camera. Thus, the costs are reduced. Furthermore, it is not necessary to store information at the time of the photographing, and there is no limitation in the environment under which the 2D image is photographed.

Figure 7:
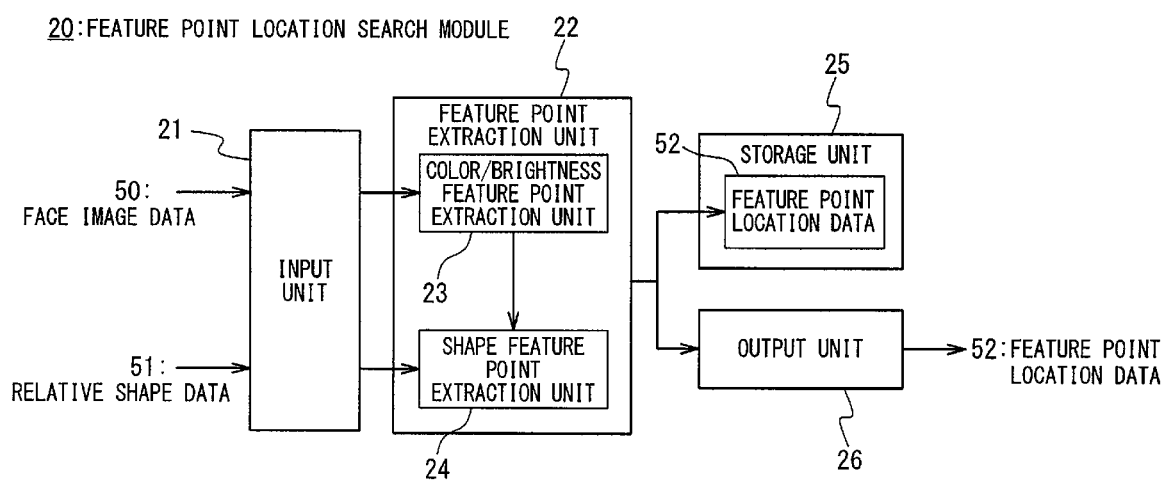
FIG. 7 is a block diagram showing a configuration of a feature point location search module in accordance with the present invention.

FIG. 7 is a block diagram showing a configuration of the feature point location search module 20 according to the present invention. The feature point location search module 20 is provided with an input unit 21, a feature point extraction unit 22, a storage unit 25 and an output unit 26. The feature point extraction unit 22 includes a color/brightness feature point extraction unit 23 and a shape feature point extraction unit 24. The storage unit 25 stores the feature point location data 52 representing locations of a plurality of "feature points" in a face therein. The feature point extraction unit 22 is a unit for generating the feature point location data 52 and is achieved with a CPU and a computer program. The storage unit 25 is exemplified by a hard disk drive or a memory.

The "feature points" of a face are points having characteristics such as a center of an eye, a tip of a nose, a bottom of the nose and the like. The feature points include a "color/brightness feature point (first feature point)" which has features of color/brightness and a "shape feature point (second feature point)" which has features of shape. The color/brightness feature point is exemplified by eyes and a mouth. For example, a lip has a stronger red component than the surroundings, and an oriental person has black eyes. These can be extracted from the color/brightness information included in an image. On the other hand, the shape feature point is exemplified by a nose and the bottom of the nose. These have the features of shape and can be extracted by using the relative shape function $(f_x, f_y)$.

Figure 8:
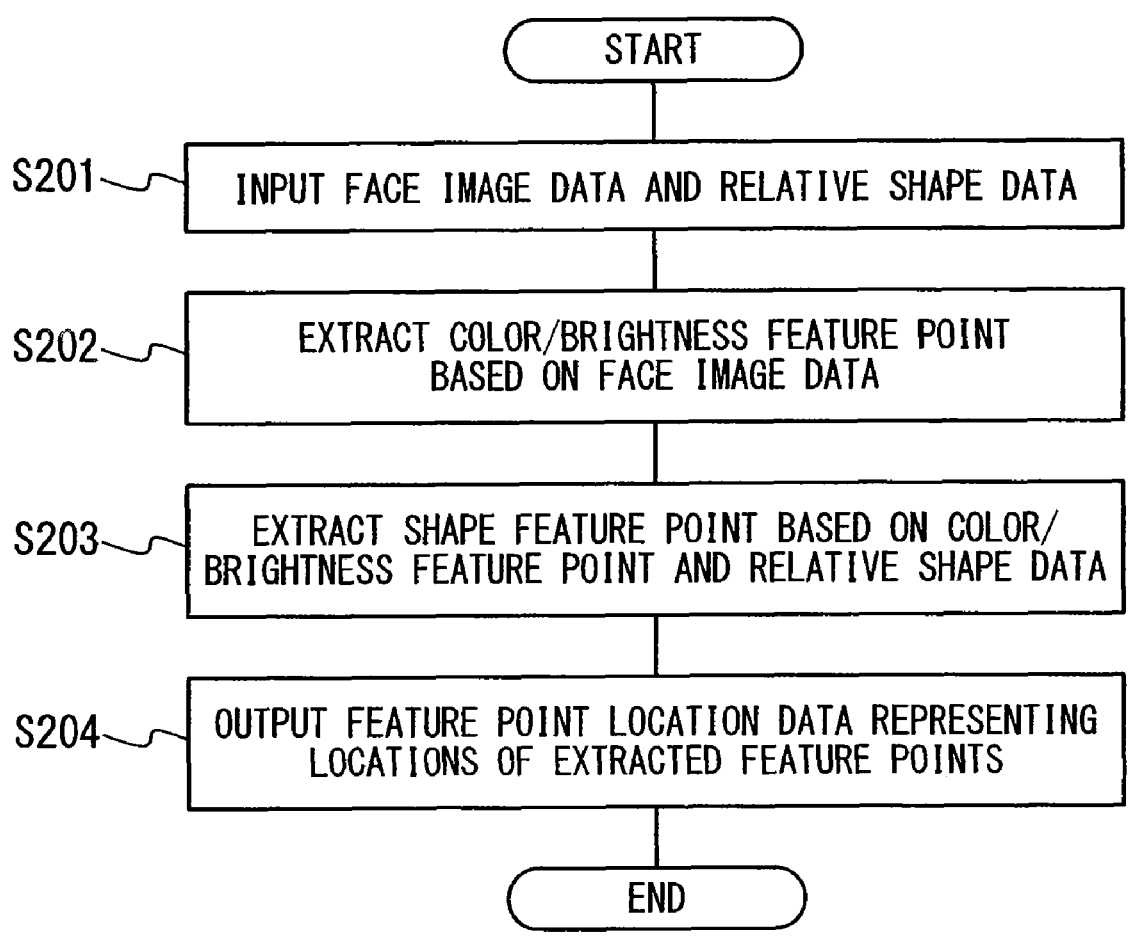
FIG. 8 is a flow chart showing an operation of the feature point location search module in accordance with the present invention.

FIG. 8 is a flow chart showing an operation of the feature point location search module 20 according to the present invention.

Step S201:

The relative shape data 51 obtained by the relative shape analysis module 10 and the above-mentioned face image data 50 are input to the feature point extraction unit 22 through the input unit 21.

Step S202:

First, the color/brightness feature point extraction unit 23 extracts the "color/brightness feature point" by using the color/brightness information included in the face image data 50. Information on the location of the color/brightness feature point is output to the shape feature point extraction unit 24.

Figure 9:
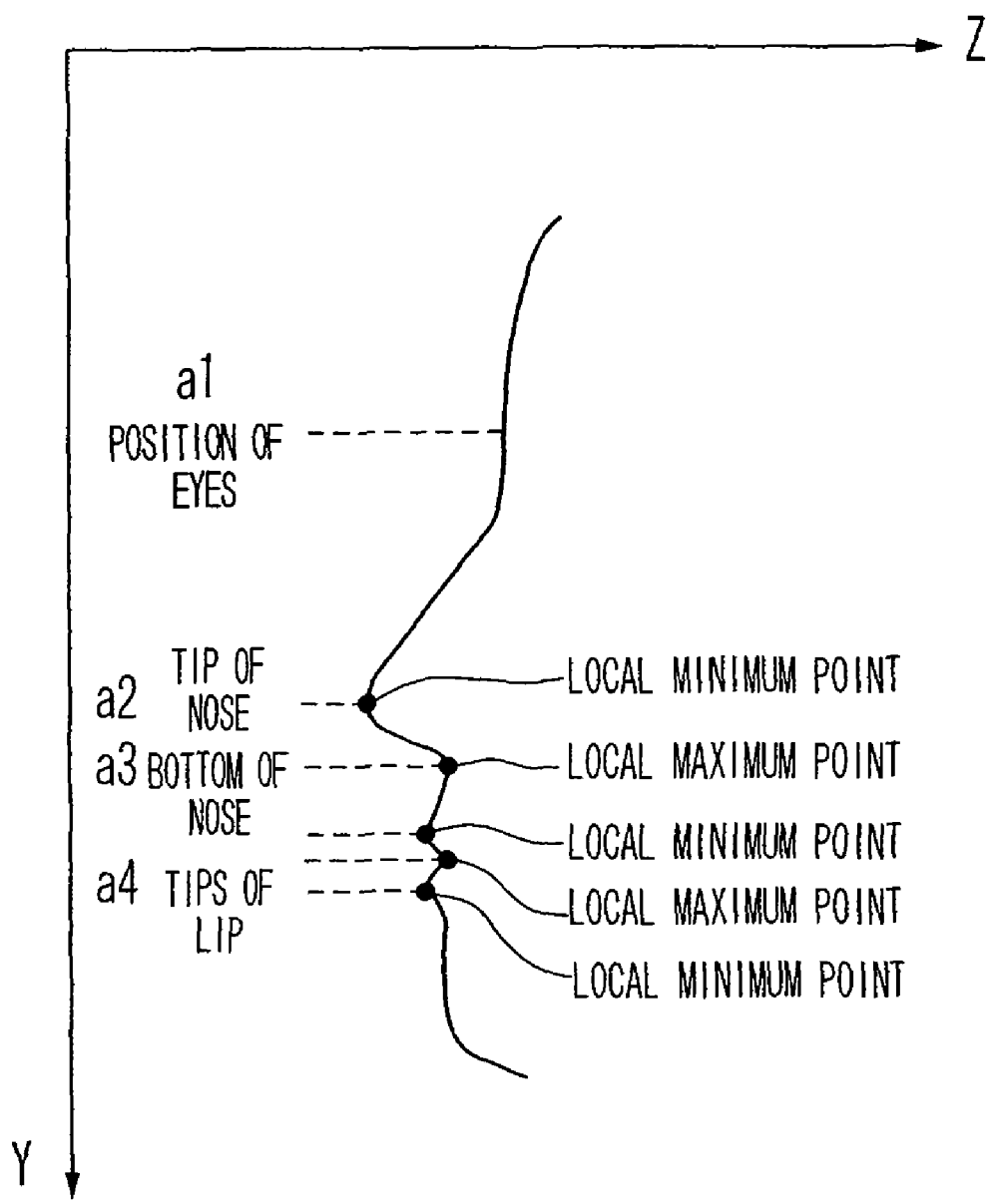
FIG. 9 is a view for explaining the operation of the feature point location search module in accordance with the present invention.

Step S203:

Next, extraction of the shape feature point such as a nose is performed. FIG. 9 shows a contour of a face when viewed from the side, that is, the shape function z=f(y) at a certain x-coordinate. It is assumed here that the certain x-coordinate corresponds to a central position between both eyes. As shown in FIG. 9, the first local minimum point of the shape function z=f(y) in the +y-direction from an eye position a1 is considered to correspond to a position a2 of the tip of the nose. Moreover, the first local maximum point is considered to correspond to a position a3 of the bottom of the nose. Furthermore, the next local minimum point is considered to correspond to a position a4 of a tip of the lip. It is therefore preferable to search for such local minimum points and local maximum points. However, the shape function f(x, y) of the face is not obtained yet. Therefore, the shape feature point extraction unit 24 calculates curvature H of the surface of the face on the basis of the following equation.

[Equation 11]

$$H = \frac{(1+f_x^2)f_{yy} + (1+f_y^2)f_{xx} - 2f_x f_y f_{xy}}{2(1+f_x^2+f_y^2)^{3/2}} \quad (11)$$

Here, the $(f_x, f_y)$ can be known from the relative shape data 51. The $f_{xx}$, $f_{yy}$ and $f_{xy}$ are second-order partial differentiation of the shape function f(x, y) and can be known from the relative shape function $(f_x, f_y)$ represented by the relative shape data 51. That is, the shape feature point extraction unit 24 can calculate the curvature H. Moreover, the position a1 of both eyes can be known from the color/brightness feature point information obtained by the color/brightness feature point extraction unit 23. Therefore, the shape feature point extraction unit 24 determines the maximum point of the curvature H in the +y-direction from the central position a1 between both eyes as the position a2 of the tip of the nose. The position a3 of the bottom of the nose and the position a4 of the tip of the lip can be determined in a similar way. In this manner, the shape feature point extraction unit 24 extracts the "shape feature point" on the basis of the 2D image of the face and the relative shape function $(f_x, f_y)$.

Step S204:

The feature point extraction unit 22 outputs the feature point location data 52 representing the locations of the color/brightness feature point and the shape feature point that are obtained in the above-mentioned Steps S202 and S203. The feature point location data 52 is output to the absolute shape analysis module 30 through the output unit 26. Moreover, the feature point location data 52 may be stored in the storage unit 25.

As described above, according to the feature point location module 20 of the present invention, it is possible to automatically find the feature points of an object from a single 2D image of the object. The reason is that the shape feature point can be extracted on the basis of the relative shape function ($f_x$, $f_y$) estimated by the relative shape analysis module 10. It is not necessary to manually designate feature points in the face image.

Figure 10:
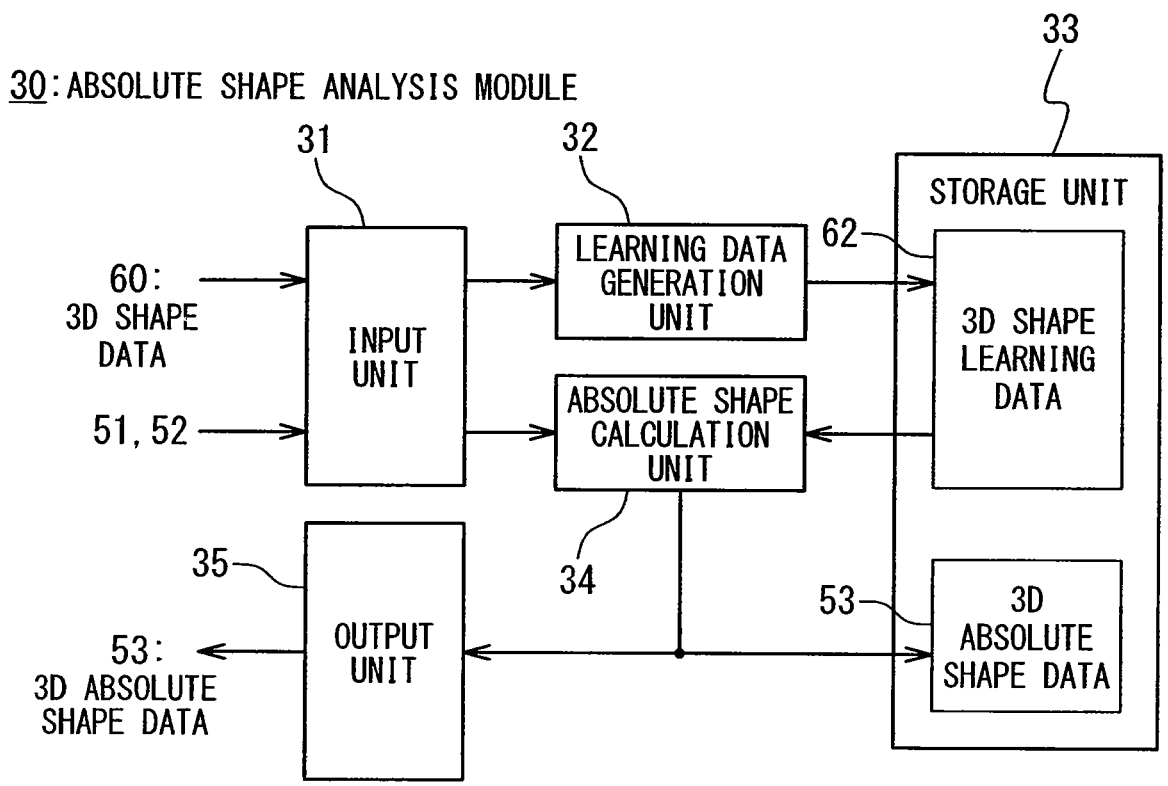
FIG. 10 is a block diagram showing a configuration of an absolute shape analysis module in accordance with the present invention.

FIG. 10 is a block diagram showing a configuration of the absolute shape analysis module 30 according to the present invention. The absolute shape analysis module 30 is provided with an input unit 31, a learning data generation unit 32, a storage unit 33, an absolute shape calculation unit 34 and an output unit 35. The storage unit 33 stores the 3D absolute shape data 53 and a 3D shape learning data 62 therein. The 3D shape learning data (second learning data) 62 represents information on the 3D shapes of faces of a plurality of persons (a plurality of objects of the same type) and is previously stored through learning. The learning data generation unit 32 is a unit for generating the 3D shape learning data 62 and is achieved with a CPU and a computer program. The absolute shape calculation unit 34 is a unit for generating the 3D absolute shape data 53 and is achieved with a CPU and a computer program. The storage unit 33 is exemplified by a hard disk drive or a memory.

Figure 11:
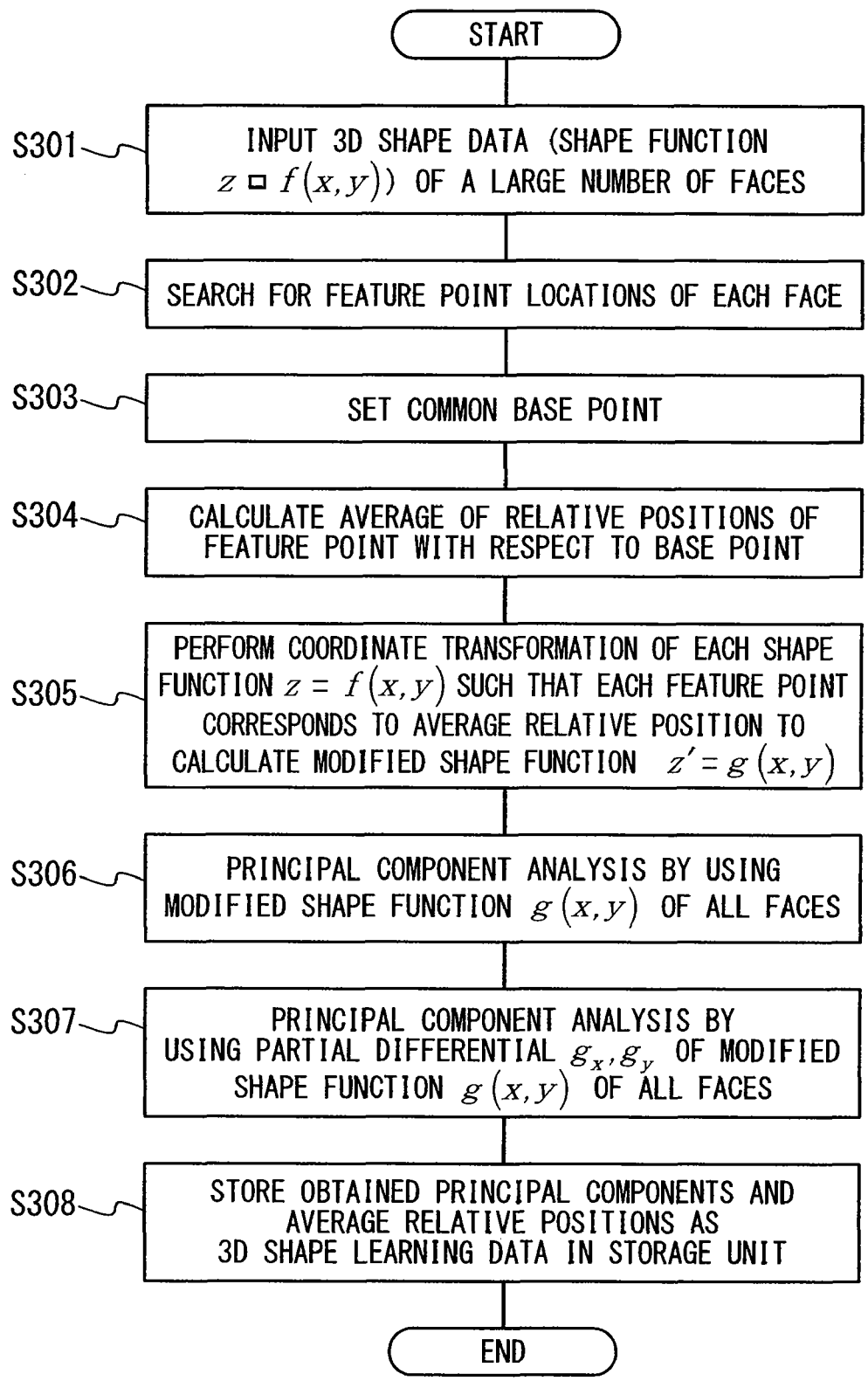
FIG. 11 is a flow chart showing an operation of the absolute shape analysis module in accordance with the present invention.

First, the 3D shape learning data 62 is generated. FIG. 11 is a flow chart showing an operation of the absolute shape analysis module 30 when generating the 3D shape learning data 62, namely, an operation of the learning data generation unit 32.

Step S301:

First, the 3D shape data (shape function z=f(x, y)) of faces of a plurality of persons are acquired by using a 3D shape measurement apparatus such as a range finder. In the acquired 3D shape data, the front plane is expressed by the xy-plane and the depth is expressed by the z-direction (see FIG. 1). The 3D shape data 60 of the faces of the plurality of persons are input to the learning data generation unit 32 through the input unit 31.

Step S302:

Next, the learning data generation unit 32 finds the feature points in each of the plurality of 3D shape data received. More specifically, the learning data generation unit 32 searches for the locations of the feature points in a similar manner as by the above-mentioned feature point extraction unit 22. In other words, the same parts as the parts extracted by the feature point extraction unit 22 are extracted. Here, since the shape function z=f(x, y) of each face is known, the learning data generation unit 32 may search for the locations of the feature points by using the shape function z. Alternatively, since the generation of the learning data is performed only once, a user may perform manually. In the present step, the locations of the plurality of feature points are determined for every face.

Step S303:

Next, the learning data generation unit 32 sets one of the extracted plurality of feature points (parts) as a "base point O". The "base point O" is a reference point (origin) for fixing the coordinate of all the 3D facial shapes, and is set with respect to all the faces in common. For example, the bottom of the nose, which exists near the center of the face, is selected as the base point O.

Figure 12:
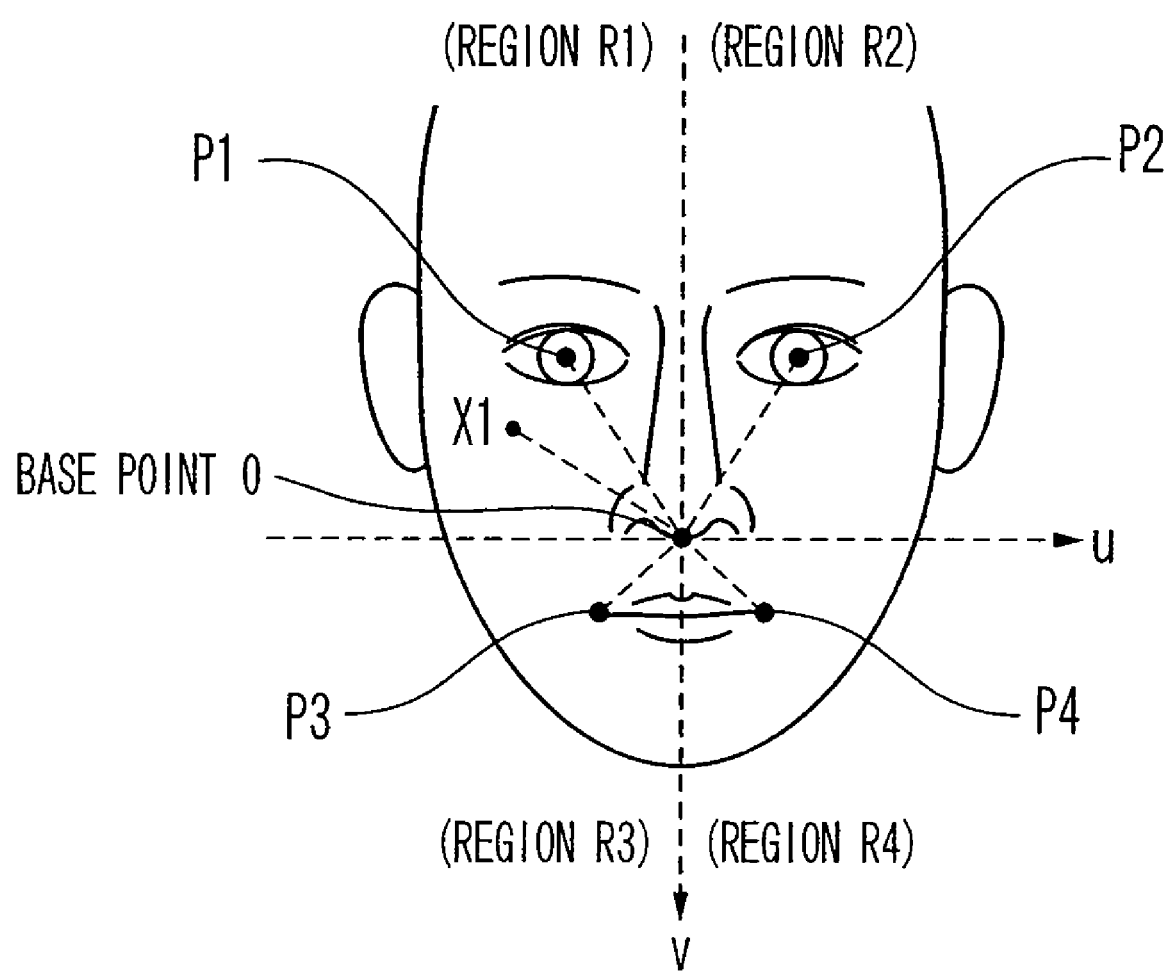
FIG. 12 is a view for explaining the operation of the absolute shape analysis module in accordance with the present invention.

Step S304:

Next, the learning data generation unit 32 calculates relative positions of the plurality of feature points other than the base point O with respect to the base point O. For example, FIG. 12 shows a face of a person. In the face, five points including centers of both eyes (P1, P2), a bottom of a nose, right and left edges of a mouth (P3, P4) are extracted as the feature points. The bottom of the nose among them is selected as the base point O. In this case, calculated are respective relative positions of the feature points P1 to P4 with respect to the base point (origin) O, namely, respective coordinates of the feature points P1 to P4 in the coordinate system whose origin is the base point O. The calculation is performed for all the 3D shape data 60. After that, the learning data generation unit 32 calculates an average value of the relative positions (average relative position) in all the faces, with regard to each of the feature points (P1, P2, P3, P4). In other words, an average value of the coordinate of each feature point is calculated, and four average relative positions are calculated for respective feature points P1 to P4.

Step S305:

Next, the learning data generation unit 32 performs coordinate transformation of the shape function f(x, y) of the all faces such that the plurality of feature points correspond to the respective average relative positions. More specifically, a peripheral region of each feature point is enlarged or reduced. In FIG. 12, for example, the face is divided into four regions R1 to R4 by coordinate axes uv passing the base point O. The regions R1 to R4 include the feature points P1 to P4, respectively. In this case, respective regions R1 to R4 are enlarged or reduced with an enlargement/reduction ratio such that the plurality of feature points P1 to P4 correspond to the respective average relative positions. For example, let us consider a case where a distance between the base point O and the feature point P1 is OP1, a distance between the base point O and an arbitrary point X1 within the region R1 is OX1, and a distance from the base point O to the average relative position of the feature point P1 is OP1'. The arbitrary point X1 within the region R1 moves to a point X1' through the enlargement/reduction operation. A distance between the base point O and the point X1' is OX1'. In this case, the distances OP1, OP1', OX1 and OX1' satisfy the following relationship.

[Equation 12]

$$OP1:OP1'=OX1:OX1' \quad (12)$$

Therefore, the point X1 is moved to the point X1' such that the relationship of the equation (12) is satisfied. In this manner, the enlargement/reduction of the regions R1 to R4 is carried out. In other words, the coordinate transformation operation is performed with respect to the shape functions f(x, y) of the all faces. A function generated by the coordinate transformation is hereinafter referred to as a "modified shape function z'". The modified shape function z' is expressed by the following equation.

[Equation 13]

$$z'=g(x,y) \quad (13)$$

The partial differential of the modified shape function z'=g(x, y) is referred to as a "modified relative shape function ($g_x$, $g_y$)", similarly to the relative shape function ($f_x$, $f_y$). The modified relative shape function ($g_x$, $g_y$) is given by the following equation.

[Equation 14]

$$(g_x, g_y) = \left(\frac{\partial z'}{\partial x}, \frac{\partial z'}{\partial y}\right) \quad (14)$$

It should be noted that the differential is practically calculated through the difference approximation, as in an image processing.

Step S306:

Next, the learning data generation unit 32 performs a component analysis by using the modified shape functions g(x, y) of all the faces to generate a component analysis data. The plurality of feature points including the base point O are the same between all the modified shape functions g(x, y) obtained at the above-mentioned Step S305. The component analysis such as a principal component analysis is performed after the correspondence is obtained. For example, let us assume a case where there are n modified shape functions z'. A value of the first modified shape function g(x, y) at a position x, y of a data (pixel) is expressed by $z_k^1$. Here, k is a parameter for one-dimensionally expressing the position of the pixel on the 2D plane, and is given by k=y×w+x (w is the number of pixels in the x-direction; see FIG. 2). Also, a value of the n-th modified shape function g(x, y) at the position k is expressed by $z_k^n$. In this case, an n-dimensional vector $Z_k$ expressed by the following equation can be defined with respect to the position (pixel) k.

[Equation 15]

$$\vec{Z}_k = (z_k^1, \ldots, z_k^n) \quad (15)$$

By arraying the vector $Z_k$ as many as the number of pixels s (s=w×h; see FIG. 2), an s-by-n matrix Z expressed by the following equation can be obtained.

[Equation 16]

$$Z = [\vec{Z}_1, \ldots, \vec{Z}_s]^t \quad (16)$$

By performing singular value decomposition of the matrix Z, the following equation can be obtained.

[Equation 17]

$$Z = U_z S_z V_z^t \quad (17)$$

Here, $U_z$ is an s-by-n matrix, $V_z^t$ is an n-by-n matrix, and $S_z$ is an n-by-n diagonal matrix. A principal component can be obtained by a column vector of the matrix $U_z$ thus obtained.

Step S307:

In a similar manner, the learning data generation unit 32 performs a component analysis by using the modified relative shape functions ($g_x$, $g_y$) of all the faces to generate a component analysis data. A value of the first modified relative shape function $g_x$ at the position (pixel) k is expressed by $d_k^1$. A value of the n-th modified relative shape function $g_x$ at the position k is expressed by $d_k^n$. A value of the first modified relative shape function $g_y$ at the position k is expressed by $e_k^1$. A value of the n-th modified relative shape function $g_y$ at the position k is expressed by $e_k^n$. In this case, n-dimensional vectors $D_k$, $E_k$ expressed by the following equation can be defined with respect to the position k.

[Equation 18]

$$\vec{D}_k = (d_k^1, \ldots, d_k^n)$$

$$\vec{E}_k = (e_k^1, \ldots, e_k^n) \quad (18)$$

By arraying these vectors $D_k$, $E_k$ as many as the number of pixels s (s=w×h), an s-by-n matrix D and an s-by-n matrix E expressed by the following equation can be obtained.

[Equation 19]

$$D = [\vec{D}_1, \ldots, \vec{D}_s]^t$$

$$E = [\vec{E}_1, \ldots, \vec{E}_s]^t \quad (19)$$

By performing singular value decomposition of the matrixes D and E, the following equations can be obtained.

[Equation 20]

$$D = U_d S_d V_d^t \quad (20)$$

[Equation 21]

$$E = U_e S_e V_e^t \quad (21)$$

Here, $U_d$ and $U_e$ are s-by-n matrixes, $V_d^t$ and $V_e^t$ are n-by-n matrixes, $S_d$ and $S_e$ are n-by-n diagonal matrixes. Principal components can be obtained by column vectors of the matrixes $U_d$ and $U_e$ thus obtained.

Step S308:

The 3D shape learning data 62 includes the information $U_z$ on the modified shape function g(x, y), the information $U_d$, $U_e$ on the modified relative shape function ($g_x$, $g_y$) and the data representing the average relative position of each feature point, which are thus obtained. The learning data generation unit 32 stores the 3D shape learning data 62 in the storage unit 33.

Figure 13:
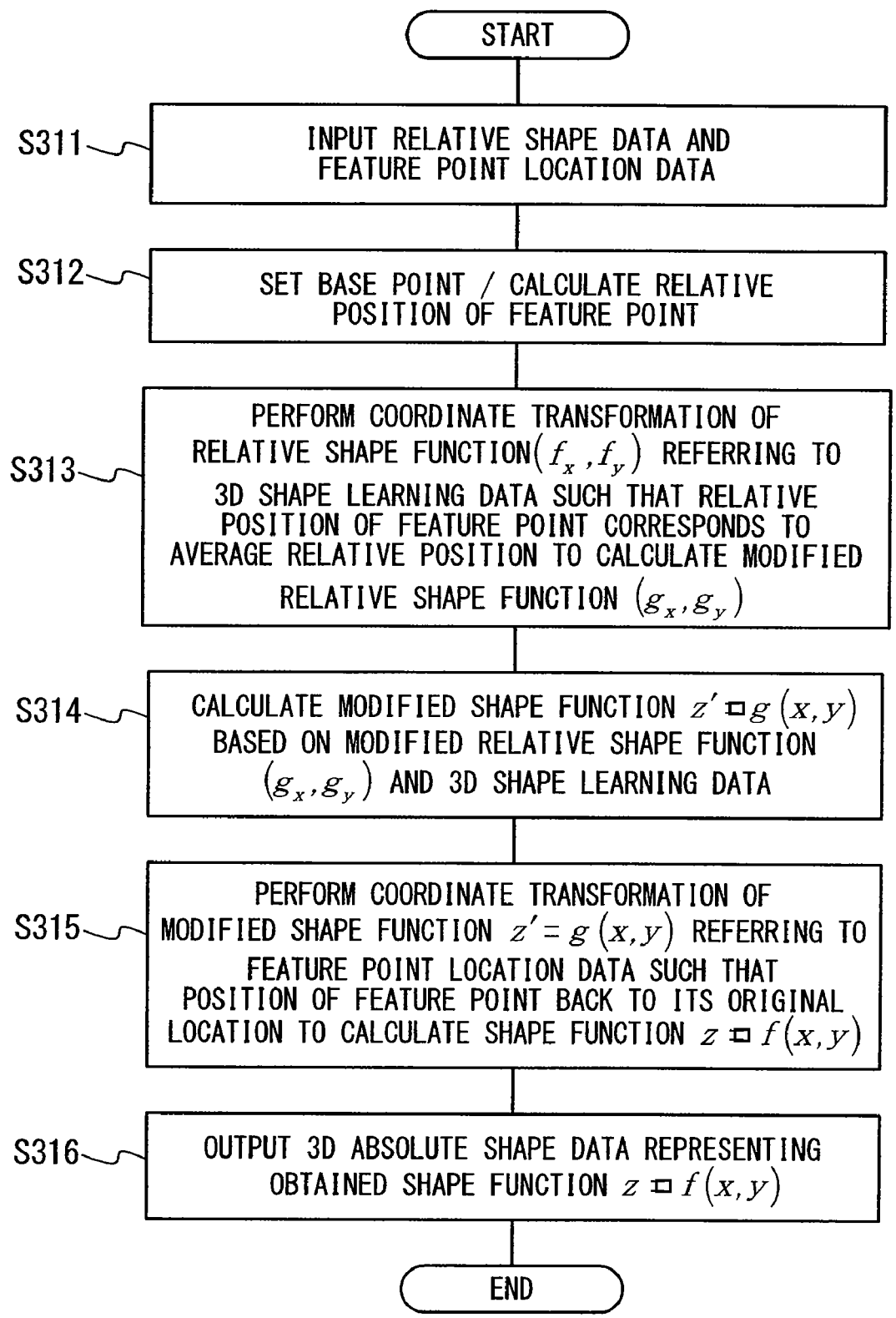
FIG. 13 is a flow chart showing an operation of the absolute shape analysis module in accordance with the present invention.

Next, described is a method for estimating the 3D absolute shape data 53 representing the shape function f(x, y) of the face of the above-mentioned person from the relative shape data 51 and the feature point location data 52 with regard to the person. FIG. 13 is a flow chart showing an operation of the absolute shape calculation unit 34 of the absolute shape analysis module 30.

Step S311:

First, the relative shape data 51 generated by the relative shape analysis module 10 and the feature point location data 52 generated by the feature point location search module 20 are input to the absolute shape calculation unit 34 through the input unit 31.

Step S312:

Next, the absolute shape calculation unit 34 sets the feature points in the relative shape function ($f_x$, $f_y$) represented by the relative shape data 51, based on the locations of the plurality of feature points represented by the feature point location data 52. Also, the absolute shape calculation unit 34 sets one of the plurality of feature points as a "base point". The base point indicates the same position as the base point that is set in the above-mentioned Step S303. Furthermore, the absolute shape calculation unit 34 calculates relative positions of the plurality of feature points other than the base point O with respect to the base point O. As a result, respective relative positions of the plurality of feature points in the face of the person under processing can be obtained.

Step S313:

Next, the absolute shape calculation unit 34 reads the 3D learning data 62 stored in the storage unit 33 and obtains the "average relative position" of each feature point. Then, the absolute shape calculation unit 34 performs coordinate transformation of the relative shape function ($f_x$, $f_y$) such that the plurality of feature points correspond to the respective average relative positions. More specifically, in a similar manner to the above-mentioned Step S305, a peripheral region of each feature point is enlarged or reduced. Due to the coordinate transformation operation, the modified relative shape function z'=($g_x$, $g_y$) of the face under processing is calculated from the relative shape function ($f_x$, $f_y$) indicated by the relative shape data 51 (refer to the equation (14)).

Step S314:

Next, the absolute shape calculation unit 34 obtains the information $U_z$ on the modified shape function g(x, y) and the information $U_d$ and $U_e$ on the modified relative shape function ($g_x$, $g_y$) of the plurality of persons from the 3D learning data 62. On the basis of these learning data and the modified relative shape function ($g_x$, $g_y$) calculated in the above-mentioned Step S313, the absolute shape calculation unit 34 calculates the modified shape function g(x, y) of the face under processing. More specifically, when the values of the modified relative shape function ($g_x$, $g_y$) at the position k (k=y×w+ x) are expressed by $g_x(k)$ and $g_y(k)$, respectively, the absolute shape calculation unit 34 generates a column vector G and an n-dimensional column vector c given by the following equations.

[Equation 22]

$$\vec{G} = (g_x(1), \ldots, g_x(s), g_y(1), \ldots, g_y(s))^t \quad (22)$$

[Equation 23]

$$\vec{c} = (c_1, \ldots, c_n)^t \quad (23)$$

By using the column vector G, the column vector c and the information $U_d$, $U_e$ indicated by the above-mentioned 3D shape learning data 62, a functional E2 given by the following equation can be defined.

[Equation 24]

$$E2 = \left\| \vec{G} - \begin{bmatrix} U_d \\ U_e \end{bmatrix} \vec{c} \right\| \quad (24)$$

The absolute shape calculation unit 34 calculates the n-dimensional column vector c with which the functional E2 takes a minimum value. Furthermore, by using the calculated column vector c and the information $U_z$ indicated by the above-mentioned 3D shape learning data 62, an s-dimensional column vector G2 given by the following equation is obtained.

[Equation 25]

$$\vec{G2} = (g(1), \ldots, g(s))^t = U_z \vec{c} \quad (25)$$

Here, s (s=w×h) is the number of pixels, and g(k) is a value of the modified shape function g(x, y) at the above-mentioned position k(k=y×w+x). That is, the modified shape function g(x, y) of the face under processing is calculated in accordance with the above-mentioned equation (25).

Step S315:

Next, the absolute shape calculation unit 34 performs coordinate transformation of the modified shape function g(x, y) such that the positions of the plurality of feature points in the obtained modified shape function g(x, y) return back to the original positions indicated by the feature point location data 52. More specifically, the peripheral region of each feature point is reduced or enlarged through an operation opposite to the above-mentioned Step S305. Through the present coordinate transformation operation, the shape function f(x, y) of the face under processing is calculated from the modified shape function g(x, y). That is to say, the 3D shape of the face under processing is estimated.

Step S316:

The absolute shape calculation unit 34 outputs the 3D absolute shape data 53 representing the shape function f(x, y) thus obtained through the output unit 35. The absolute shape calculation unit 34 may store the 3D absolute shape data 53 in the storage unit 33. In this manner, the absolute shape analysis module 30 converts the relative shape function ($f_x$, $f_y$) of the face indicated by the relative shape data 51 into the shape function f(x, y) of the face, by referring to the 3D shape learning data 62 and the feature point location data 52.

As described above, according to the 3D shape estimation system 1 and the 3D shape estimation method of the present invention, it is possible to obtain the 3D absolute shape data 53 from the face image data 50. In other words, it is possible to estimate the 3D shape of an object from a single 2D image of the object. Here, it is not necessary to take a picture of the object with the use of a special photographic equipment such as a stereo/multiple-lens camera or the like. Thus, the costs are reduced. Moreover, it is not necessary to store information at the time of the photographing, and there is no limitation in the environment under which the 2D image is photographed. During the processing of the present invention, the illumination basis B and the relative shape function ($f_x$, $f_y$) of the object are estimated from the 2D image. In addition, it is possible to automatically find the feature points of the object without designating manually.

SECOND EMBODIMENT

Figure 14:
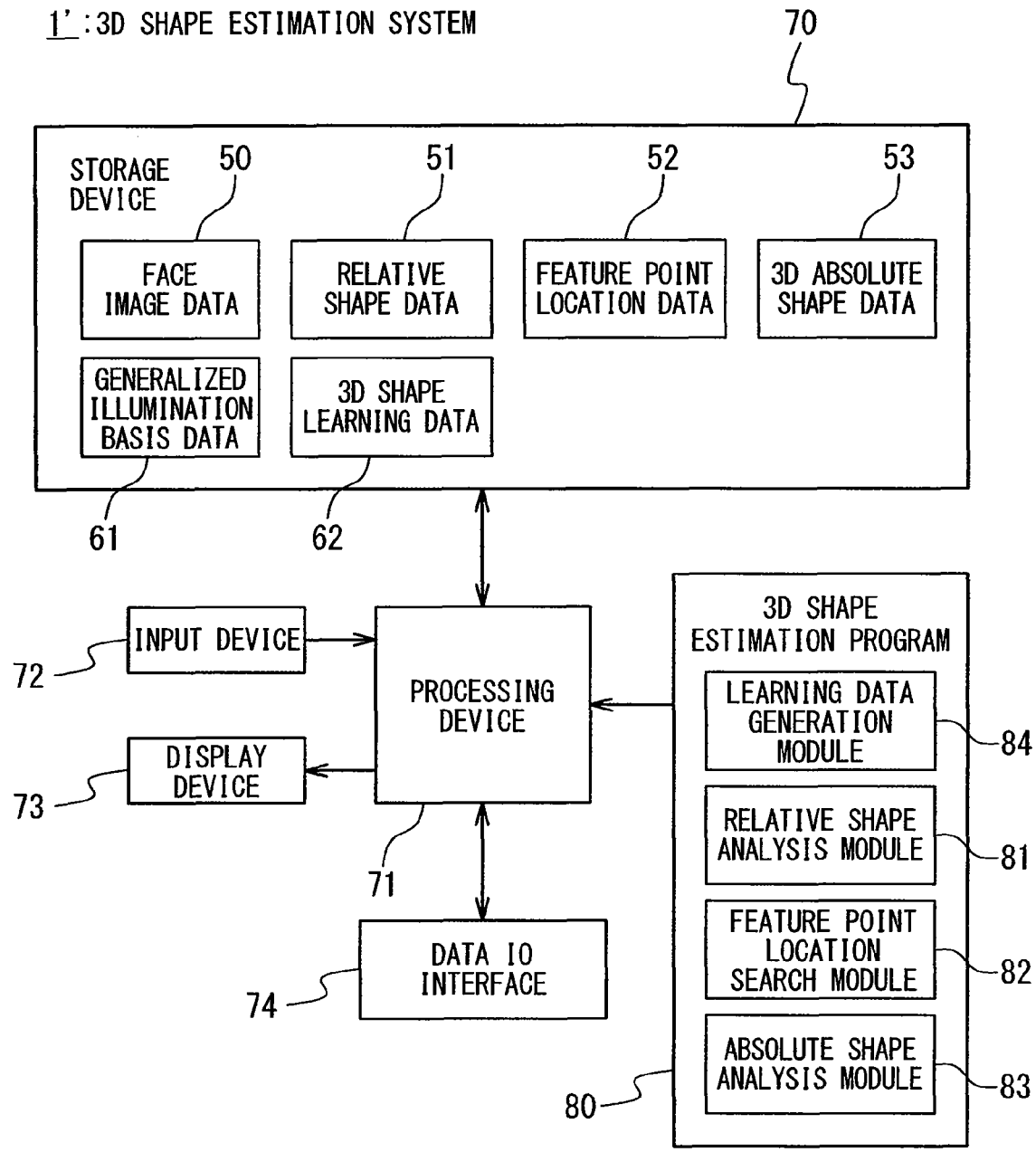
FIG. 14 is a block diagram showing a configuration of a 3D shape estimation system in accordance with a second embodiment of the present invention.

The functions in accordance with the first embodiment can be achieved by a computer system and a computer program. FIG. 14 is a block diagram showing a configuration of a 3D shape estimation system according to a second embodiment of the present invention. The 3D shape estimation system 1' has a storage device 70, a processing device 71, an input device 72, a display device 73, a data input/output interface 74 and a 3D shape estimation program 80.

The storage device 70 is a memory such as a hard disk drive (HDD) and a RAM. Stored in the storage device 70 are face image data 50, the relative shape data 51, the feature point location data 52, the 3D absolute shape data 53, the generalized illumination basis data 61 and the 3D shape learning data 62 mentioned above. The processing device 71 is connected to each device and performs data transmission and various operations.

A keyboard and a mouse are used as examples of the input device 72. A user can input data and designate various commands by using the input device 72. The display device 73 is a display, and various information are notified to the used by the display device 73. The user can input a new command and data on the basis of the notified information. The data input/output interface 74 is used for inputting the face image data 50 and the 3D shape data 60. Therefore, the data input/output interface 74 is connected to imaging equipments such as a range finder, a digital camera and the like, a CD/DVD drive, another terminal and so forth.

The 3D shape estimation program 80 is a software program executed by the processing device 71. The 3D shape estimation program 80 includes a relative shape analysis module 81, a feature point location search module 82, an absolute shape analysis module 83 and a learning data generation module 84. The program set may be stored in the storage device 70. The program is executed by the processing device 71, and thereby the same functions as in the first embodiment can be achieved.

More specifically, the processing device 71 generates the relative shape data 51 from the face image data 50, in accordance with commands of the relative shape analysis module 81 of the 3D shape estimation program 80. This is the same function as that of the relative shape calculation unit 14 in FIG. 4 (see also FIG. 6). Also, the processing device 71 generates the feature point location data 52 from the face image data 50 and the relative shape data 51, in accordance with commands of the feature point location search module 82 of the 3D shape estimation program 80. This is the same function as that of the feature point extraction unit 22 in FIG. 7 (see also FIG. 8). Also, the processing device 71 generates the 3D absolute shape data 53 from the relative shape data 51 and the feature point location data 52, in accordance with commands of the absolute shape analysis module 83 of the 3D shape estimation program 80. This is the same function as that of the absolute shape calculation unit 34 in FIG. 10 (see also FIG. 13). Also, the processing device 71 generates the generalized illumination basis data 61 and the 3D shape learning data 62, in accordance with commands of the learning data generation module 84 of the 3D shape estimation program 80. This is the same function as that of the learning data generation unit 12 in FIG. 4 and the learning data generation unit 32 in FIG. 10 (see also FIG. 5 and FIG. 11).

According to the 3D shape estimation system 1' and the 3D shape estimation program 80 described above, it is possible to estimate a 3D shape of an object from a single 2D image of the object. Since it is not necessary to use any special measurement apparatus, the costs can be reduced. Moreover, it is possible to estimate the illumination basis B and the relative shape function $f_x$, $f_y$ of the object from the single 2D image. Furthermore, it is possible to automatically find the feature points of the object from the single 2D image.

THIRD EMBODIMENT

Figure 15:
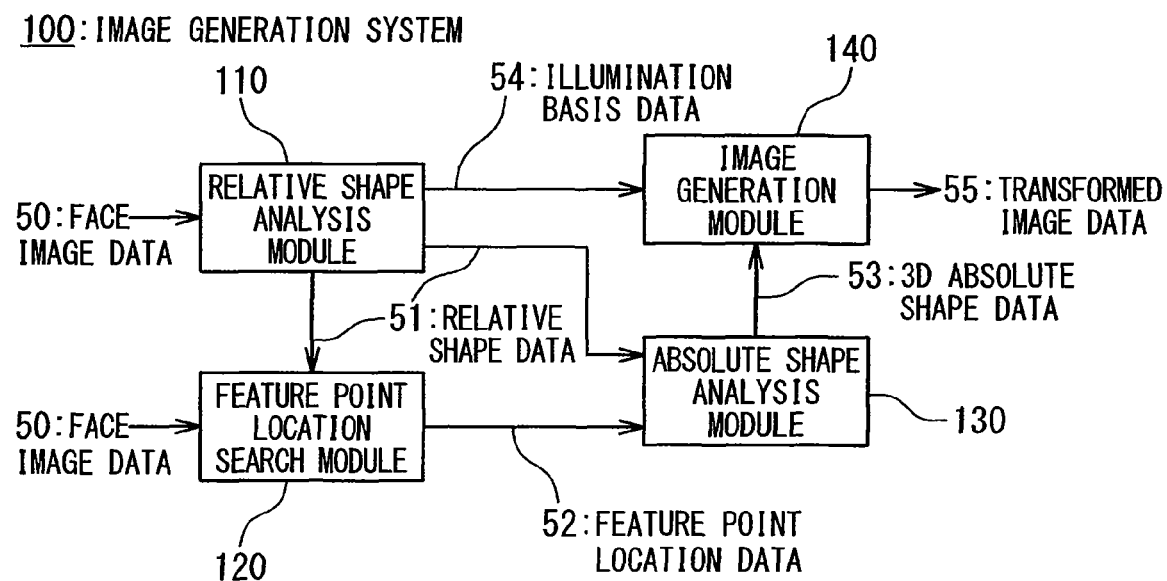
FIG. 15 is a block diagram showing a configuration of an image generation system in accordance with a third embodiment of the present invention.

FIG. 15 is a block diagram showing a configuration of an image generation system in accordance with a third embodiment of the present invention. The image generation system 100 has a relative shape analysis module 110, a feature point location search module 120, an absolute shape analysis module 130 and an image generation module 140. The image generation system 100 generates a transformed image data 55 representing a 2D image with a different illumination condition (illumination-transformed image) or a 2D image with a different illumination condition and a different facial orientation (rotation-transformed image) from the face the image data 50 representing the 2D image of the face (see FIG. 2).

The relative shape analysis module 110 in the present embodiment has the same configuration as the relative shape analysis module 10 in the first embodiment. That is, the relative shape analysis module 110 generates the relative shape data 51 from the face image data 50, and outputs the relative shape data 51 to the feature point location search module 120 and the absolute shape analysis module 130. In the present embodiment, the relative shape analysis module 110 outputs an illumination basis data 54 representing the illumination basis B calculated in the above-mentioned Step S114 to the image generation module 140.

The feature point location search module 120 in the present embodiment has the same configuration as the feature point location search module 20 in the first embodiment. That is, the feature point location search module 120 generates the feature point location data 52 from the face image data 50 and the relative shape data 51, and outputs the feature point location data 52 to the absolute shape analysis module 130.

The absolute shape analysis module 130 in the present embodiment has the same configuration as the absolute shape analysis module 30 in the first embodiment. That is, the absolute shape analysis module 130 generates the 3D absolute shape data 53 from the relative shape data 51 and the feature point location data 52. In the present embodiment, the 3D absolute shape data 53 is output to the image generation module 140.

Figure 16:
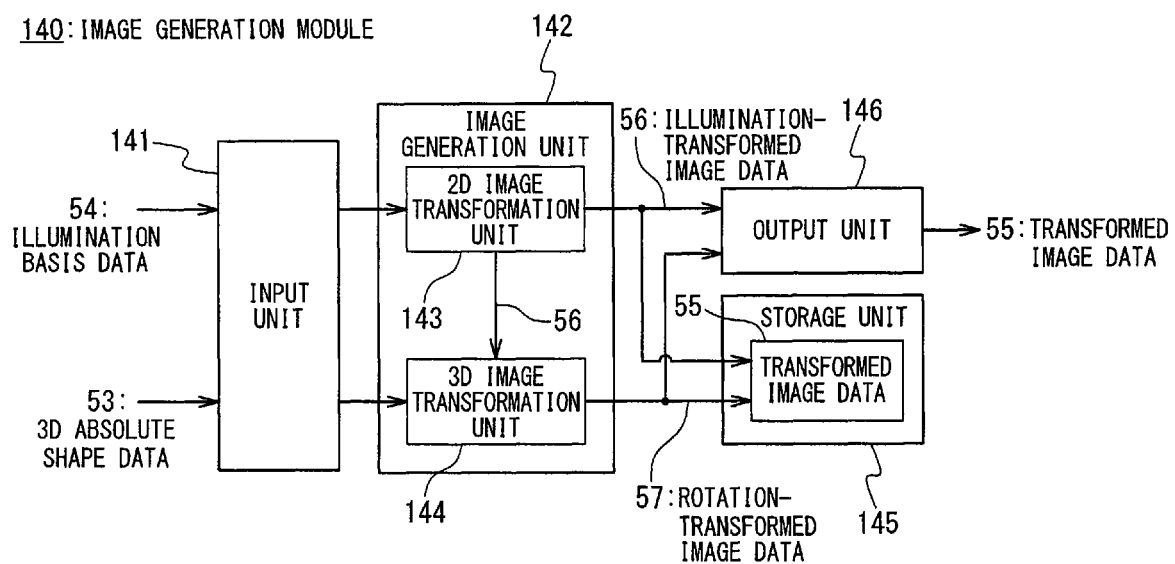
FIG. 16 is a block diagram showing a configuration of an image generation module in accordance with the present invention.

The image generation module 140 receives the 3D absolute shape data 53 and the illumination basis data 54 and creates the transformed image data 55. FIG. 16 is a block diagram showing a configuration of the image generation module 140 in the present embodiment. The image generation module 140 is provided with an input unit 141, an image generation unit 142, a storage unit 145 and an output unit 146. The image generation unit 142 includes a 2D image transformation unit 143 and a 3D image transformation unit 144. The storage unit 145 stores the transformed image data 55 therein. The image generation unit 142 is a unit for generating the transformed image data 55 and is achieved with a CPU and a computer program. The storage unit 145 is exemplified by a hard disk drive and a memory.

Figure 17:
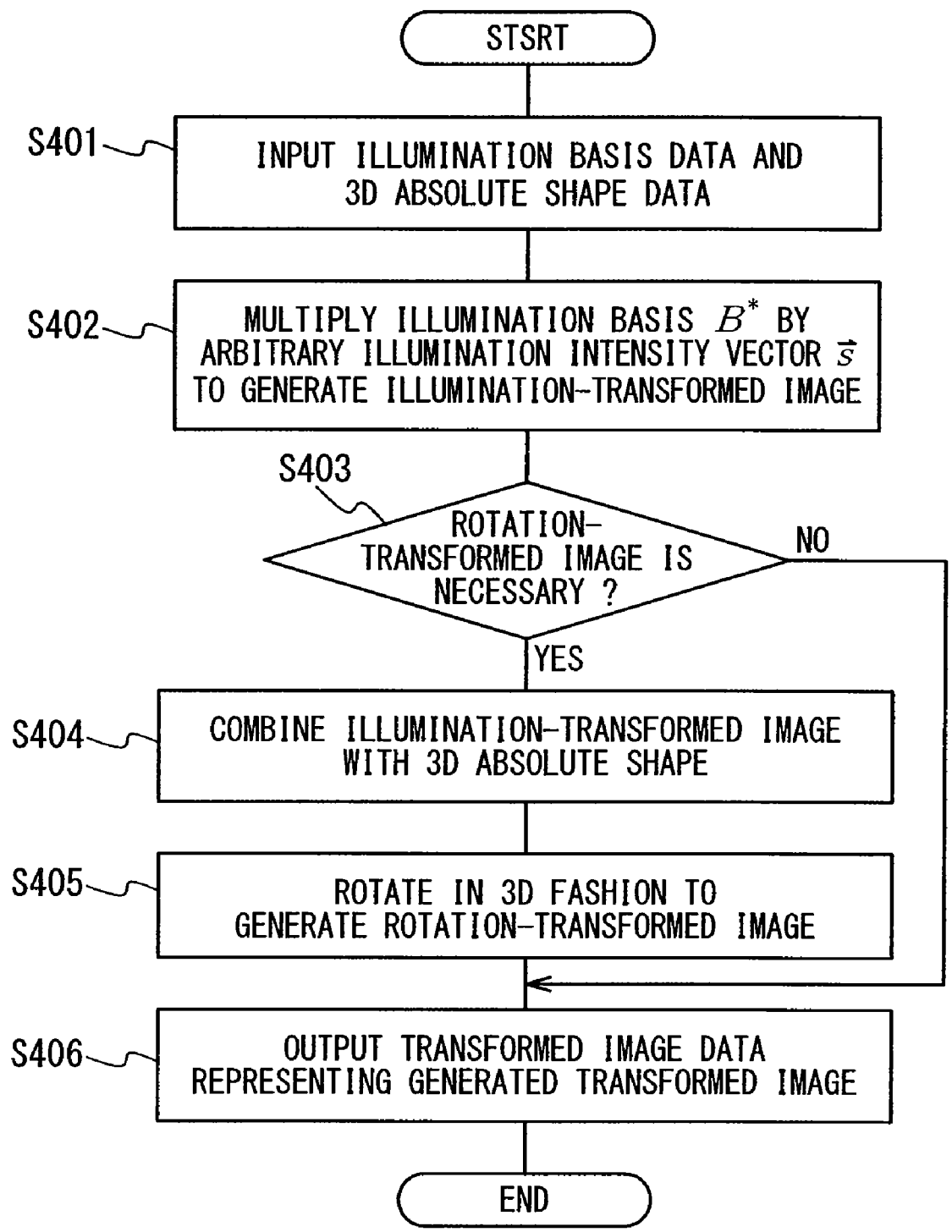
FIG. 17 is a flow chart showing an operation of the image generation module in accordance with the present invention.

FIG. 17 is a flow chart showing an operation of the image generation module 140 according to the present invention.

Step S401:
First, the image generation unit 142 receives the illumination basis data 54 from the relative shape analysis module 110 and the 3D absolute shape data 53 from the absolute shape analysis module 130 through the input unit 141.

Step S402:
As shown in the above-mentioned equation (6), the 2D image transformation unit 143 multiplies the illumination basis B of a person indicated by the illumination basis data 54 by an arbitrary illumination intensity vector s. Thereby, a 2D face image (illumination-transformed image) under a different illumination condition from the 2D face image indicated by the face image data 50 is obtained. The 2D image transformation unit 143 outputs an illumination-transformed image data 56 representing the illumination-transformed image.

In a case when a rotation-transformed image is not necessary (Step S403; No), the generated illumination-transformed image data 56 is output as the transformed image data 55 through the output unit 146 (Step S406). The illumination-transformed image data 56 may be stored in the storage unit 145 as the transformed image data 55. In this manner, according to the present embodiment, it is possible to create the illumination-transformed image with a different illumination condition by using only the relative shape analysis module 110 and the image generation module 140.

Step S404:
In a case when a rotation-transformed image is necessary (Step S403: Yes), the 3D image transformation unit 144 receives the illumination-transformed image data 56 generated in the above-mentioned Step S402 in addition to the 3D absolute shape data 53. That is to say, the 3D image transformation unit 144 receives the "estimated 3D shape (shape function f(x, y))" and the "illumination-transformed image with a different illumination condition" with regard to the face under processing. Then, the 3D image transformation unit 144 combines the illumination-transformed image and the 3D shape, namely, pastes the illumination-transformed image on the 3D shape. As a result, a "new 3D shape with a different illumination condition" is generated.

Step S405:
Next, the 3D image transformation unit 144 rotates the new 3D shape in a 3D fashion to set the orientation of the face to a desired orientation. Thereby, a 2D image (rotation-transformed image) having a different illumination condition and a different facial orientation from the original 2D image can be obtained. The 3D image transformation unit 144 outputs a rotation-transformed image data 57 representing the rotation-transformed image.

Step S406:
The image generation unit 142 outputs at least one of the illumination-transformed image data 56 and the rotational transformed image data 57 thus generated as the transformed image data 55. The transformed image data 55 is output to the outside through the output unit 146 or stored in the storage unit 145.

As described above, according to the image generation system 100 and the image generation method of the present invention, it is possible to generate an image of an object with a different orientation or a different illumination condition from a single 2D image of the object.

FOURTH EMBODIMENT

Figure 18:
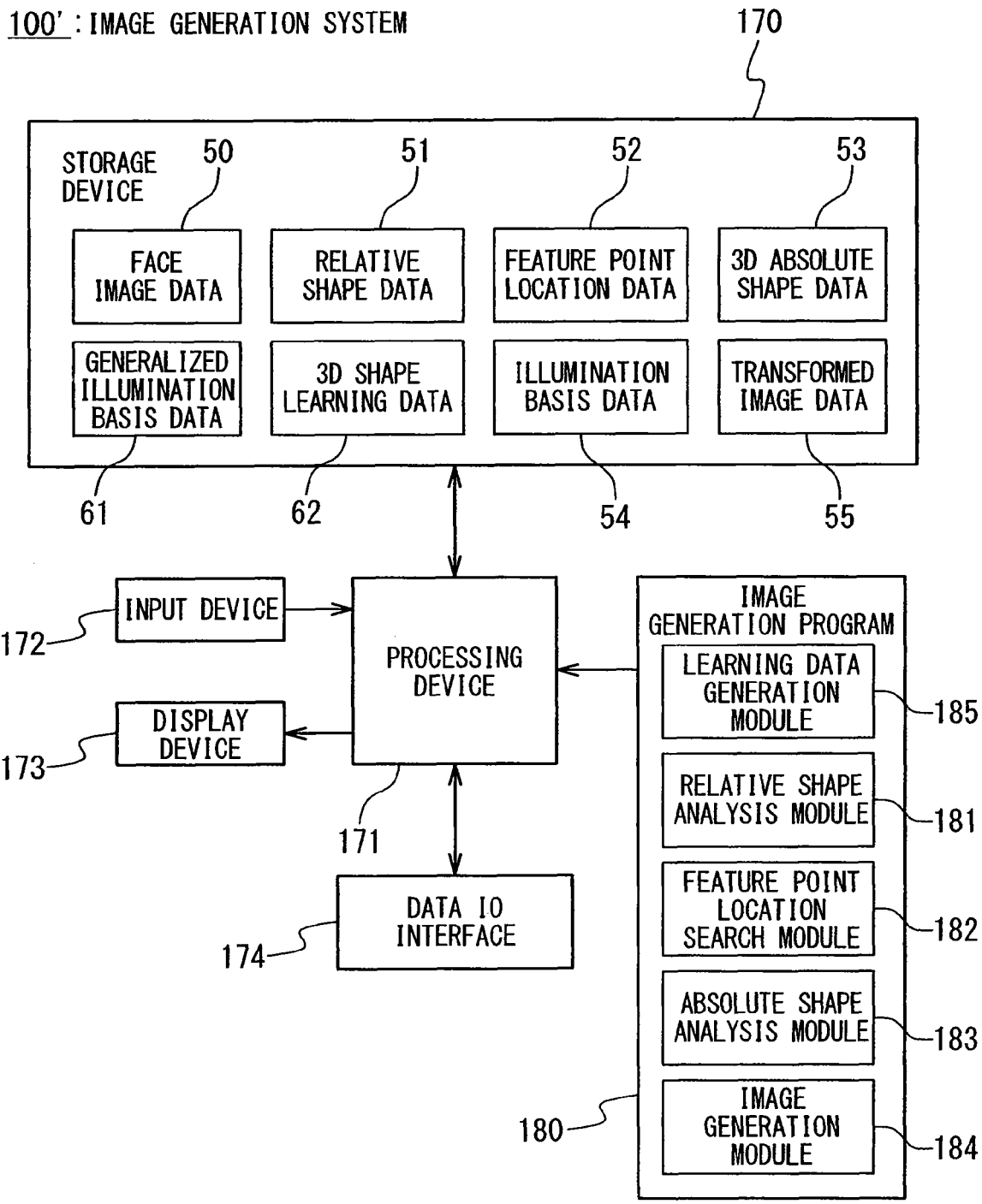
FIG. 18 is a block diagram showing a configuration of an image generation system in accordance with a fourth embodiment of the present invention.

The functions in accordance with the third embodiment can be achieved by a computer system and a computer program. FIG. 18 is a block diagram showing a configuration of an image generation system in accordance with a fourth embodiment of the present invention. The image generation system 100' has a storage device 170, a processing device 171, an input device 172, a display device 173, a data input/output interface 174 and an image generation program 180.

The storage device 170 is a memory such as a hard disk drive (HDD) and a RAM. Stored in the storage device 170 are the face image data 50, the relative shape data 51, the feature point location data 52, the 3D absolute shape data 53, the illumination basis data 54, the transformed image data 55, the generalized illumination basis data 61 and the 3D shape learning data 62 mentioned above. The processing device 71 is connected to each device and performs data transmission and various operations.

A keyboard and a mouse are used as examples of the input device 172. A user can input data and designate various commands by using the input device 172. The display device 173 is a display, and various information are notified to the user by the display device 173. The user can input a new command and data on the basis of the notified information. The data input/output interface 174 is used for inputting the face image data 50 and the 3D shape data 60. Therefore, the data input/output interface 174 is connected to imaging equipments such as a range finder, a digital camera and the like, a CD/DVD drive, another terminal and so forth.

The image generation program 180 is a software program executed by the processing device 171. The image generation program 180 includes a relative shape analysis module 181, a feature point location search module 182, an absolute shape analysis module 183, an image generation module 184 and a learning data generation module 185. The program set may be stored in the storage device 170. The program is executed by the processing device 171, and thereby the same functions as in the third embodiment can be achieved.

More specifically, the processing device 171 generates the relative shape data 51 and the illumination basis data 54 from the face image data 50, in accordance with commands of the relative shape analysis module 181 of the image generation program 180. This is the same function as that of the relative shape analysis module 110 in FIG. 15. Also, the processing device 171 generates the feature point location data 52 from the face image data 50 and the relative shape data 51, in accordance with commands of the feature point location search module 182 of the image generation program 180. This is the same function as that of the feature point location search module 120 in FIG. 15. Also, the processing device 171 generates the 3D absolute shape data 53 from the relative shape data 51 and the feature point location data 52, in accordance with commands of the absolute shape analysis module 183 of the image generation program 180. This is the same function as that of the absolute shape analysis module 130 in FIG. 15. Also, the processing device 171 generates the transformed image data 55 from the illumination basis data 54 and the 3D absolute shape data 53, in accordance with commands of the image generation module 184 of the image generation program 180. This is the same function as that of the image generation module 140 in FIG. 15. Also, the processing device 171 generates the generalized illumination basis data 61 and the 3D shape learning data 62, in accordance with commands of the learning data generation module 185 of the image generation program 180. This is the same function as that of the learning data generation unit 12 in FIG. 4 and the learning data generation unit 32 in FIG. 10

As described above, according to the image generation system 100' and the image generation program 180 of the present invention, it is possible to generate an image of an object with a different orientation or a different illumination condition from a single 2D image of the object.

The present invention described above can be applied to, in particular, a security field such as a personal identification method, a cosmetic surgery field, an amusement field and the like.

The invention claimed is:

1. A 3D shape estimation system comprising:
    a storage device configured to store a first learning data and a second learning data which represent illumination bases and 3D shapes of a plurality of objects, respectively;
    a relative shape analysis module configured to calculate an illumination basis of an object based on a 2D image of said object and said first learning data, to calculate a relative shape function that is partial differential of a shape function representing a 3D shape of said object from said calculated illumination basis, and to output a relative shape data representing said relative shape function;
    a feature point location search module configured to extract a plurality of feature points from said 2D image based on said 2D image and said relative shape data, and to output a feature point location data representing locations of said plurality of feature points; and
    an absolute shape analysis module configured to receive said relative shape data and said feature point location data, to convert said relative shape function into said shape function by referring to said second learning data and said locations of said plurality of feature points, and to output a 3D absolute shape data representing said shape function.

2. The 3D shape estimation system according to claim 1, wherein said plurality of feature points include at least one first feature point having a feature of color or brightness and at least one second feature point having a feature of shape,
    wherein said feature point location search module extracts said first feature point by using said 2D image,
    wherein said feature point location search module calculates curvature of a surface of said object by using said relative shape function indicated by said relative shape data and extracts said second feature point based on a location of said first feature point and said curvature.

3. The 3D shape estimation system according to claim 1, wherein when said 2D image is expressed by using an xy-coordinate system, said shape function is expressed by f(x, y), said relative shape function is expressed by $(f_x, f_y)=(\partial f/\partial x, \partial f/\partial y)$, and said illumination basis is expressed by $B=\{B_x, B_y, B_z\}$; $B_\alpha=\{b_{i,\alpha}\}$ ($\alpha$=x, y, z; i is a number of each pixel),
    wherein said relative shape analysis module calculates said relative shape function $(f_x, f_y)$ by $(f_x, f_y)=(b_{i,x}/b_{i,z}, b_{i,y}/b_{i,z})$, based on said calculated illumination basis.

4. The 3D shape estimation system according to claim 1, wherein when said 2D image is expressed by using an xy-coordinate system, said shape function is expressed by f(x, y) and said relative shape function is expressed by $(f_x, f_y)=(\partial f/\partial x, \partial f/\partial y)$,
    wherein when one of said plurality of feature points is set as an origin, a position of each of said plurality of feature points is expressed as a relative position, wherein said second learning data includes:
information representing an average value of relative positions in said plurality of objects with respect to each of said plurality of feature points;
information of a modified shape function g(x, y) that is obtained for each of said plurality of objects by performing coordinate transformation of said shape function f(x, y) such that relative positions of said plurality of feature points correspond to respective average values; and
information of a modified relative shape function $(g_x, g_y) = (\partial g/\partial x, \partial g/\partial y)$ that is partial differential of said modified shape function g(x, y).

5. The 3D shape estimation system according to claim 4,
wherein said absolute shape analysis module calculates said relative positions of said plurality of feature points of said object with respect to said origin based on said feature point location data,
calculates said modified relative shape function $(g_x, g_y)$ of said object by performing coordinate transformation of said relative shape function $(f_x, f_y)$ indicated by said relative shape data such that said relative positions of said plurality of feature points correspond to said respective average values indicated by said second learning data,
converts said modified relative shape function $(g_x, g_y)$ of said object into said modified shape function g(x, y) of said object by referring to said information of said modified shape function g(x, y) and said modified relative shape function $(g_x, g_y)$ indicated by said second learning data, and
calculates said shape function f(x, y) of said object by performing coordinate transformation of said modified shape function g(x, y) such that positions of said plurality of feature points return back to said locations indicated by said feature point location data.

6. The 3D shape estimation system according to claim 1,
said plurality of objects and said object are human's faces.

7. An image generation system comprising:
the 3D shape estimation system according to claim 1; and
an image generation module,
wherein said image generation module receives an illumination basis data representing said illumination basis of said object from said relative shape analysis module of said 3D shape estimation system, and generates an illumination-transformed image with a different illumination condition from said 2D image based on said illumination basis and arbitrary illumination intensity.

8. The image generation system according to claim 7,
wherein said image generation module receives said 3D absolute shape data of said object from said absolute shape analysis module of said 3D shape estimation system,
generates a new 3D shape with a different illumination condition by combining said illumination-transformed image with said 3D shape, and
generates a rotation-transformed image with a different illumination condition and different orientation of said object from said 2D image by rotating said new 3D shape.

9. A non-transitory computer-readable recording medium comprising a 3D shape estimation program, when executed, causing a computer to perform the following steps of:
(A) storing a first learning data and a second learning data which represent illumination bases and 3D shapes of a plurality of objects, respectively, in a storage device;
(B) calculating an illumination basis of an object based on a 2D image of said object and said first learning data;
(C) calculating a relative shape function that is partial differential of a shape function representing a 3D shape of said object, based on said calculated illumination basis;
(D) extracting a plurality of feature points from said 2D image, based on said 2D image and said relative shape function; and
(E) converting said calculated relative shape function into said shape function by referring to said second learning data and locations of said plurality of feature points.

10. The 3D shape estimation program according to claim 9,
wherein said plurality of feature points include at least one first feature point having a feature of color/brightness and at least one second feature point having a feature of shape,
wherein said (D) step includes:
(D1) extracting said first feature point by using said 2D image;
(D2) calculating curvature of a surface of said object by using said relative shape function; and
(D3) extracting said second feature point based on a location of said first feature point and said calculated curvature.

11. The 3D shape estimation program according to claim 9,
wherein when said 2D image is expressed by using an xy-coordinate system, said shape function is expressed by f(x, y), said relative shape function is expressed by $(f_x, f_y) = (\partial f/\partial x, \partial f/\partial y)$, and said illumination basis is expressed by $B = \{B_x, B_y, B_z\}$; $B\alpha = \{b_{i,\alpha}\}$ ($\alpha = x, y, z$; i is a number of each pixel),
wherein in said (C) step, said relative shape function $(f_x, f_y)$ is calculated by $(f_x, f_y) = (b_{i,x}/b_{i,z}, b_{i,y}/b_{i,z})$ based on said calculated illumination basis.

12. The 3D shape estimation program according to claim 9,
wherein when said 2D image is expressed by using an xy-coordinate system, said shape function is expressed by f(x, y) and said relative shape function is expressed by $(f_x, f_y) = (\partial f/\partial x, \partial f/\partial y)$,
wherein said (A) step includes:
(A1) reading respective 3D shapes of said plurality of objects;
(A2) determining locations of said plurality of feature points with respect to each of said plurality of objects, based on said 3D shapes;
(A3) determining one of said plurality of feature points as an origin;
(A4) calculating a position of each of said plurality of feature points with respect to said origin as a relative position;
(A5) calculating an average value of relative positions in said plurality of objects for each of said plurality of feature points;
(A6) calculating a modified shape function g(x, y) by performing coordinate transformation of said shape function f(x, y) such that relative positions of said plurality of feature points correspond to respective average values;
(A7) calculating a modified relative shape function $(g_x, g_y) = (\partial g/\partial x, \partial g/\partial y)$ that is partial differential of said modified shape function g(x, y); and
(A8) storing said second learning data in said storage device, said second learning data including information of said modified shape function g(x, y), information of said modified relative shape function $(g_x, g_y)$ and data representing said average value with respect to each of said plurality of feature points.

13. The 3D shape estimation program according to claim 12, wherein said (E) step includes:

(E1) calculating said relative positions of said plurality of feature points of said object with respect to said origin;

(E2) calculating said modified relative shape function ($g_x$, $g_y$) of said object by performing coordinate transformation of said relative shape function ($f_x$, $f_y$) such that said relative positions of said plurality of feature points correspond to said respective average values indicated by said second learning data;

(E3) converting said modified relative shape function ($g_x$, $g_y$) of said object into said modified shape function $g(x, y)$ of said object, by referring to said information of said modified shape function $g(x, y)$ and said modified relative shape function ($g_x$, $g_y$) indicated by said second learning data; and (E4) calculating said shape function $f(x, y)$ of said object by performing coordinate transformation of said modified shape function $g(x, y)$ such that positions of said plurality of feature points return back to said locations indicated by said 2D image.

14. A non-transitory computer-readable recording medium comprising an image generation program, when executed, causing a computer to perform the following steps of:

(a) storing a first learning data and a second learning data representing illumination bases and 3D shapes of a plurality of objects respectively, in a storage device (b) calculating an illumination basis of an object, based on a 2D image of said object and said first learning data; and (c) generating an illumination-transformed image with a different illumination condition from said 2D image, based on said illumination basis and arbitrary illumination intensity;

(d) calculating a relative shape function that is partial differential of a shape function representing a 3D shape of said object, based on said calculated illumination basis;

(e) extracting a plurality of feature points from said 2D image, based on said 2D image and said relative shape function;

(f) converting said calculated relative shape function into said shape function by referring to said second learning data and locations of said plurality of feature points;

(g) generating a new 3D shape with a different illumination condition based on said illumination-transformed image and said shape function; and (h) generating a rotation-transformed image with a different illumination condition and different orientation of said object from said 2D image, by rotating said new 3D shape.

15. A 3D shape estimation method in a 3D shape estimation system provided with a processing device operating in accordance with commands of a computer program and a storage device connected to said processing device, comprising:

(A) storing by said processing device a first learning data and a second learning data which represent illumination bases and 3D shapes of a plurality of objects, respectively, in said storage device;

(B) calculating by said processing device an illumination basis of an object based on a 2D image of said object and said first learning data;

(C) calculating by said processing device a relative shape function that is partial differential of a shape function representing a 3D shape of said object, based on said calculated illumination basis;

(D) extracting by said processing device a plurality of feature points from said 2D image, based on said 2D image and said relative shape function; and (E) converting by said processing device said calculated relative shape function into said shape function by referring to said second learning data and locations of said plurality of feature points.

16. The 3D shape estimation method according to claim 15, wherein said plurality of feature points include at least one first feature point having a feature of color/brightness and at least one second feature point having a feature of shape, wherein said (D) step includes:

(D1) extracting by said processing device said first feature point by using said 2D image;

(D2) calculating by said processing curvature of a surface of said object by using said relative shape function; and (D3) extracting by said processing device said second feature point based on a location of said first feature point and said calculated curvature.

17. The 3D shape estimation method according to claim 15, wherein when said 2D image is expressed by using an xy-coordinate system, said shape function is expressed by $f(x, y)$, said relative shape function is expressed by ($f_x$, $f_y$)=($\partial f/\partial x$, $\partial f/\partial y$), and said illumination basis is expressed by $B=\{B_x, B_y, B_z\}$; $B_\alpha=\{b_{i,\alpha}\}$ ($\alpha$=x, y, z; i is a number of each pixel), wherein in said (C) step, said relative shape function ($f_x$, $f_y$) is calculated by ($f_x$, $f_y$)=($b_{i,x}/b_{i,z}$, $b_{i,y}/b_{i,z}$) based on said calculated illumination basis.

18. The 3D shape estimation method according to claim 15, wherein when said 2D image is expressed by using an xy-coordinate system, said shape function is expressed by $f(x, y)$ and said relative shape function is expressed by ($f_x$, $f_y$)=($\partial f/\partial x$, $\partial f/\partial y$), wherein said (A) step includes:

(A1) reading by said processing device respective 3D shapes of said plurality of objects;

(A2) determining by said processing device locations of said plurality of feature points with respect to each of said plurality of objects, based on said 3D shapes;

(A3) determining by said processing device one of said plurality of feature points as an origin;

(A4) calculating by said processing device a position of each of said plurality of feature points with respect to said origin as a relative position;

(A5) calculating by said processing device an average value of relative positions in said plurality of objects for each of said plurality of feature points;

(A6) calculating by said processing device a modified shape function $g(x, y)$ by performing coordinate transformation of said shape function $f(x, y)$ such that relative positions of said plurality of feature points correspond to respective average values;

(A7) calculating by said processing device a modified relative shape function ($g_x$, $g_y$)=($\partial g/\partial x$, $\partial g/\partial y$) that is partial differential of said modified shape function $g(x, y)$; and (A8) storing by said processing device said second learning data in said storage device, said second learning data including information of said modified shape function $g(x, y)$, information of said modified relative shape function ($g_x$, $g_y$) and data representing said average value with respect to each of said plurality of feature points.

19. The 3D shape estimation method according to claim 18, wherein said (E) step includes:
- (E1) calculating by said processing device said relative positions of said plurality of feature points of said object with respect to said origin;
- (E2) calculating by said processing device said modified relative shape function $(g_x, g_y)$ of said object by performing coordinate transformation of said relative shape function $(f_x, f_y)$ such that said relative positions of said plurality of feature points correspond to said respective average values indicated by said second learning data;
- (E3) converting by said processing device said modified relative shape function $(g_x, g_y)$ of said object into said modified shape function $g(x, y)$ of said object, by referring to said information of said modified shape function $g(x, y)$ and said modified relative shape function $(g_x, g_y)$ indicated by said second learning data; and
- (E4) calculating by said processing device said shape function $f(x, y)$ of said object by performing coordinate transformation of said modified shape function $g(x, y)$ such that positions of said plurality of feature points return back to said locations indicated by said 2D image.

20. An image generation method in an image generation system provided with a processing device operating in accordance with commands of a computer program and a storage device connected to said processing device, comprising:
- (a) storing a first learning data and a second learning data representing illumination bases and 3D shapes of a plurality of objects respectively, in a storage device
- (b) calculating by said processing device an illumination basis of an object, based on a 2D image of said object and said first learning data; and
- (c) generating by said processing device an illumination-transformed image with a different illumination condition from said 2D image, based on said illumination basis and arbitrary illumination intensity;
- (d) calculating by said processing device a relative shape function that is partial differential of a shape function representing a 3D shape of said object, based on said calculated illumination basis;
- (e) extracting by said processing device a plurality of feature points from said 2D image, based on said 2D image and said relative shape function;
- (f) converting by said processing device said calculated relative shape function into said shape function by referring to said second learning data and locations of said plurality of feature points;
- (g) generating by said processing device a new 3D shape with a different illumination condition based on said illumination-transformed image and said shape function; and
- (h) generating by said processing device a rotation-transformed image with a different illumination condition and different orientation of said object from said 2D image, by rotating said new 3D shape.

* * * * *